United States Patent
Diller et al.

(10) Patent No.: US 9,001,619 B2
(45) Date of Patent: Apr. 7, 2015

(54) METHOD FOR IMAGING MICROSEISMIC EVENTS USING AN AZIMUTHALLY-DEPENDENT FOCAL MECHANISM

(75) Inventors: David Diller, Greenwood Village, CO (US); Barry Fish, Arvada, CO (US); Ran Xuan, Westminster, TX (US); Charles John Sicking, Plano, TX (US)

(73) Assignee: Global Microseismic Services, Inc., Missouri City, TX (US)

( * ) Notice: Subject to any disclaimer, the term of this patent is extended or adjusted under 35 U.S.C. 154(b) by 660 days.

(21) Appl. No.: 13/277,178

(22) Filed: Oct. 19, 2011

(65) Prior Publication Data

US 2013/0100770 A1  Apr. 25, 2013

(51) Int. Cl.
G01V 1/28 (2006.01)
G01V 1/30 (2006.01)

(52) U.S. Cl.
CPC ............ *G01V 1/288* (2013.01); *G01V 2210/65* (2013.01)

(58) Field of Classification Search
USPC .............................. 367/14, 38, 56; 702/13, 14
See application file for complete search history.

(56) References Cited

U.S. PATENT DOCUMENTS

| | | |
|---|---|---|
| 5,532,978 A | 7/1996 | Corrigan |
| 6,389,361 B1 | 5/2002 | Geiser |
| 7,127,353 B2 | 10/2006 | Geiser |
| 7,391,675 B2 | 6/2008 | Drew |
| 7,647,183 B2 | 1/2010 | Jechumtalova et al. |
| 7,660,199 B2 | 2/2010 | Drew |
| 7,978,563 B2 | 7/2011 | Thornton et al. |
| 2005/0190649 A1 | 9/2005 | Eisner et al. |
| 2009/0010104 A1 | 1/2009 | Leaney |
| 2009/0052279 A1 | 2/2009 | Sicking et al. |
| 2011/0295508 A1* | 12/2011 | Lee et al. ........................ 702/11 |
| 2013/0100769 A1* | 4/2013 | Riley et al. ....................... 367/37 |

OTHER PUBLICATIONS

Quantitative Seismology, Second Edition. University Science Books. 2002, pp. 108-109 Aki, Keiiti and Richards, Paul G.
Double-couple earthquake focal mechanism—random rotation, Yan Y. Kagan, Geophys. J. Int. (2005) 163, 1065-1072.
Simplified algorithms for calculating double-couple rotation, Yan Y. Kagan, Geophys. J. Int. (2007) 171, 411-418.
USGS Focal Mechanisms—Web page.
U.S. Appl. No. 13/070,442, filed Mar. 23, 2011, Geiser et al.

* cited by examiner

*Primary Examiner* — Ian J Lobo

(57) ABSTRACT

Disclosed herein are various embodiments of methods and systems for determining the orientation and direction of first motion of a fault or fracture by optimizing an azimuthally-dependent attribute of signals generated by microseismic sources, comprising: recording microseismic data traces using a of sensors located at a plurality of sensor positions; subdividing the subsurface volume into spatial volumes corresponding to selected time intervals and comprising a plurality of voxels; for each voxel, applying a time shift to the microseismic data traces that is substantially equal to a travel time from each voxel to the corresponding sensor position, and determining for the voxel the orientation and direction of first motion of the fault or fracture corresponding to a maximum value for the voxel of at least one azimuthally-dependent attribute of the microseismic data traces.

66 Claims, 16 Drawing Sheets

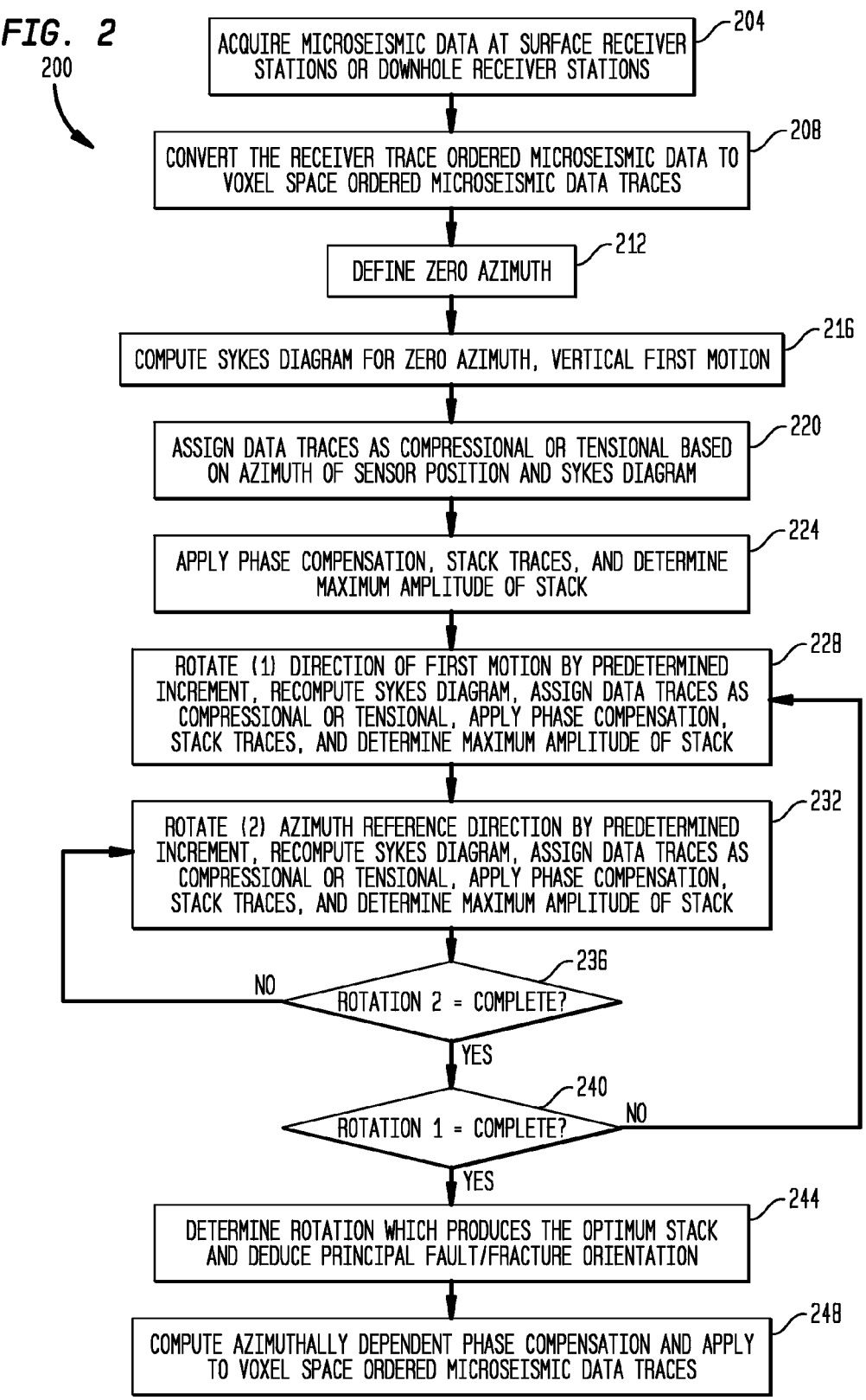

SCHEMATIC DIAGRAM OF A FOCAL MECHANISM
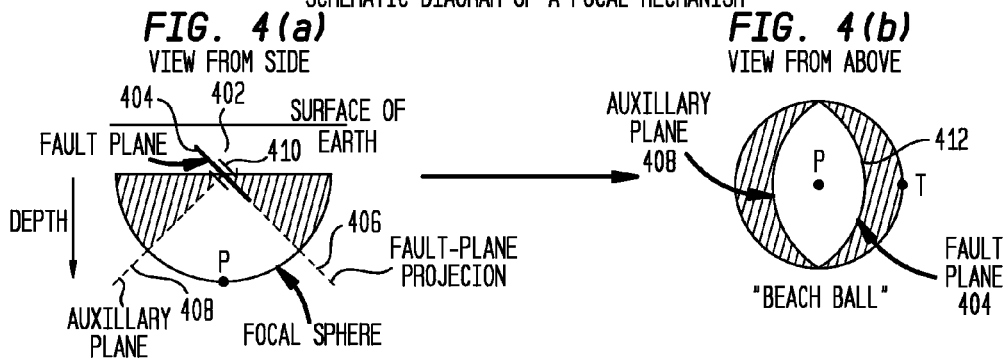
FIG. 4(a) VIEW FROM SIDE
FIG. 4(b) VIEW FROM ABOVE
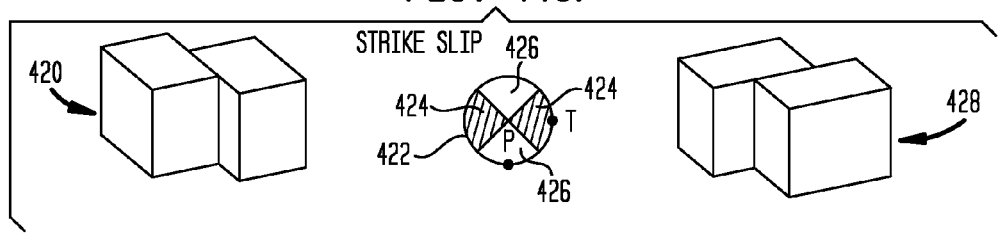
FIG. 4(c)
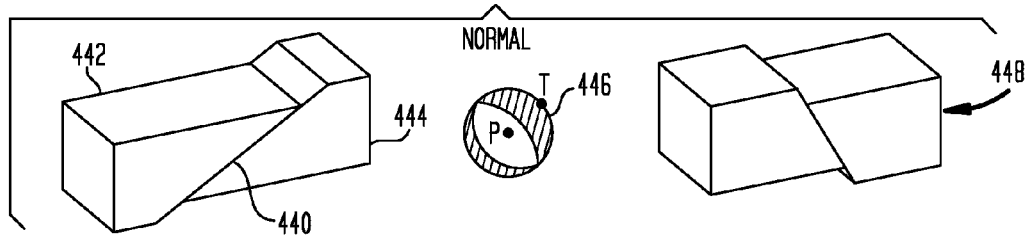
FIG. 4(d)
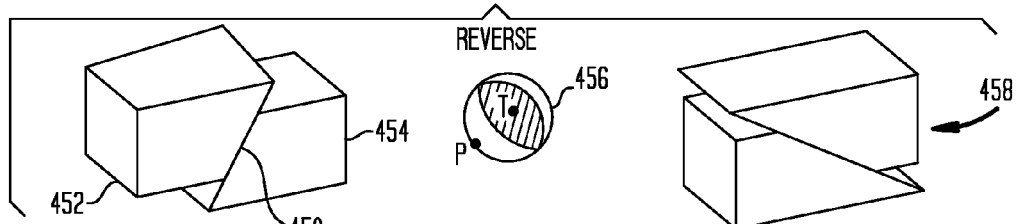
FIG. 4(e)
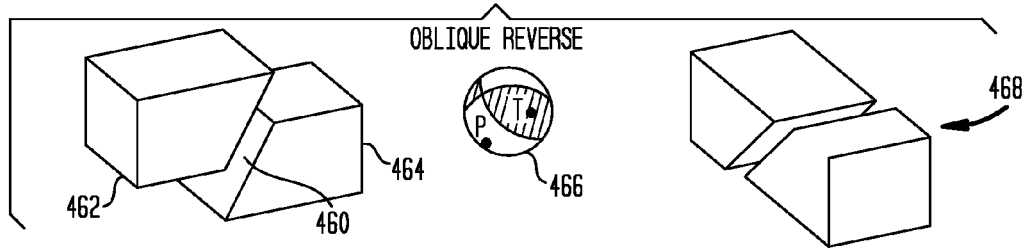
FIG. 4(f)

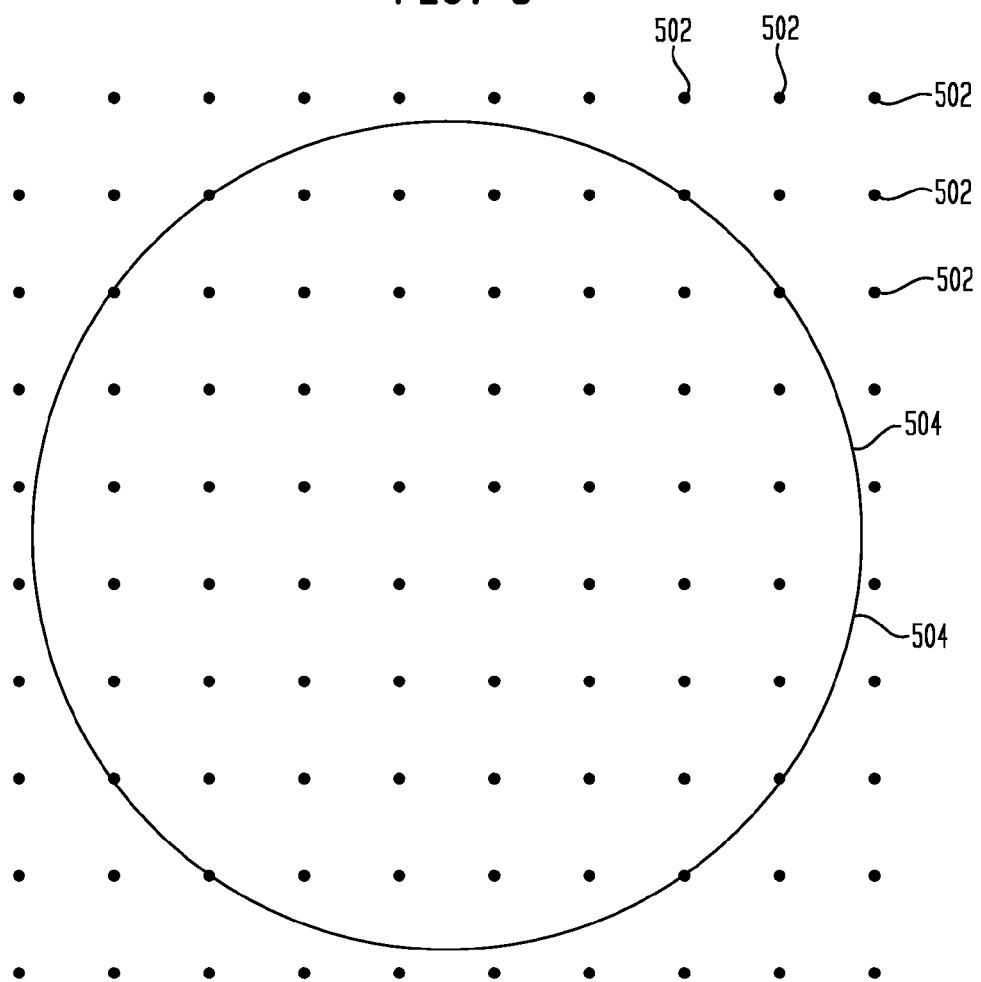

RECORDED MICROSEISMIC TRACES AT A VOXEL

TIME SHIFTED MICROSEISMIC TRACES AT A VOXEL

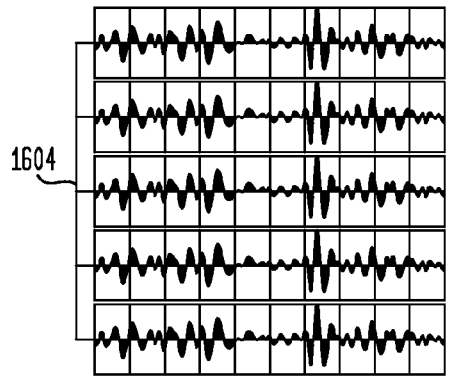
FIG. 16(a)
COMPRESSIONAL TRACES
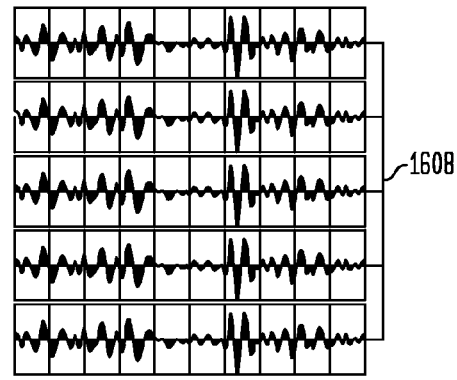
FIG. 16(b)
TENSIONAL TRACES
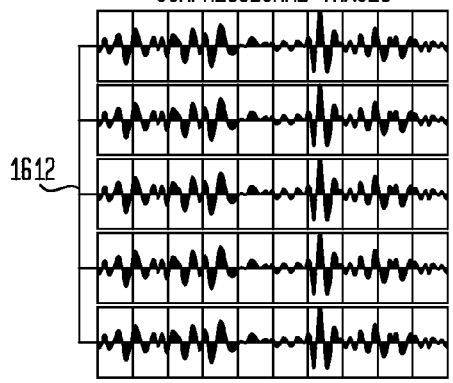
FIG. 16(c)
COMPRESSIONAL TRACES
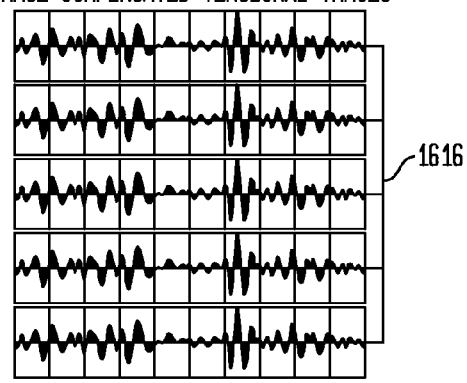
FIG. 16(d)
PHASE COMPENSATED TENSIONAL TRACES
FIG. 16(e)
STACKED COMPRESSIONAL AND PHASE COMPENSATED TENSIONAL TRACES
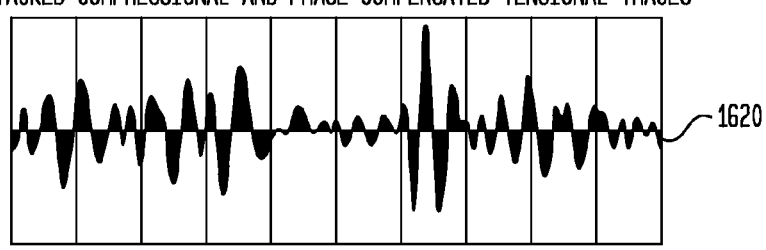

METHOD FOR IMAGING MICROSEISMIC EVENTS USING AN AZIMUTHALLY-DEPENDENT FOCAL MECHANISM

FIELD

Various embodiments described herein relate to the field of seismic data acquisition and processing, and devices, systems and methods associated therewith.

BACKGROUND

Microseismic data acquisition and processing has been used for some time to image faults in the subsurface of the earth. More recently, microseismic techniques have been used to monitor fractures occurring in the subsurface of the earth as a result of hydraulic fracturing. When hydraulic fracturing fluid is pumped at high pressure into a well bore, the surrounding geologic layers fracture, and emit energy in the form of seismic waves. This seismic energy can be mapped to show the location, the extent and the effectiveness of the hydraulic fracturing operation.

In conventional seismic surveying, a controlled source such as explosives or a vibratory source is used. These sources have well known characteristics. In microseismic surveying, the source of the energy is a fracture in the subsurface of the earth, which has directional characteristics, and does not emit energy equally in all directions. Microseismic data processing uses many techniques from conventional seismic surveying, and many new techniques have been developed specifically for processing microseismic data. Most microseismic processing does not take into account the characteristics of the source of the energy, and therefore produces less than optimal results. What is required are improved techniques for processing microseismic data.

SUMMARY

In one embodiment, there is provided a method of determining an azimuth and a direction of first motion of a fault or fracture plane in a subsurface of the earth by optimizing at least one azimuthally-dependent attribute of microseismic signals generated by one or more microseismic sources, comprising: recording microseismic data traces corresponding to the generated microseismic signals using a plurality of sensors located at a plurality of sensor positions, the microseismic signals originating within a volume of the subsurface of the earth, located at least one of near and in the fault or fracture; subdividing the subsurface volume into a plurality of spatial volumes, each spatial volume corresponding to a selected time interval, each spatial volume comprising a plurality of voxels corresponding thereto; for each voxel within a selected spatial volume, applying a time shift to microseismic data traces corresponding thereto, wherein the time shift is substantially equal to a travel time from each voxel to the sensor position corresponding thereto, thereby to produce a time shifted microseismic data trace for each combination of voxel and sensor position; selecting a subset of the voxels corresponding to the selected spatial volume for determination of the azimuth and direction of first motion, and for a selected voxel within the selected subset, determining for the voxel the azimuth of the fault or fracture plane and the direction of first motion of the fault or fracture corresponding to a maximum value of at least one azimuthally-dependent attribute of the microseismic data traces.

In another embodiment there is provided a method of determining an azimuth and a dip of a fault or fracture in a subsurface of the earth and a direction of first motion by optimizing at least one azimuthally-dependent attribute of microseismic signals generated by at least one microseismic source, comprising: recording microseismic data traces corresponding to the microseismic signals using a plurality of sensors located at a plurality of sensor positions, the microseismic signals originating within a volume of the subsurface; subdividing the subsurface volume into a spatial volume comprising a plurality of voxels; for each voxel within the spatial volume, applying a time shift to microseismic data traces corresponding thereto, wherein the time shift is substantially equal to a travel time from the voxel to the sensor position corresponding thereto, thereby to produce a time shifted microseismic data trace for each combination of voxel and sensor position; selecting a subset of the voxels for determination of the azimuth, dip and direction of first motion, and for each voxel within the selected subset, determining for the voxel the azimuth and dip of the fault or fracture and the direction of first motion of the fault or fracture corresponding to a maximum value of at least one azimuthally-dependent attribute of the microseismic data traces.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

FIG. 2 shows one embodiment of a method of determining the orientation of a fault or fracture and designing azimuthally-dependent correction factors;

FIGS. 4(a) through 4(f) show a schematic of several different types of fault or fracture focal mechanism using the "beach-ball" display;

FIG. 5 shows a view from above of a microseismic recording array;

FIGS. 16(a) through 16(e) show microseismic data traces with compressional and tensional first motion before and after phase compensation.

The drawings are not necessarily to scale. Like numbers refer to like parts or steps throughout the drawings.

DETAILED DESCRIPTIONS OF SOME EMBODIMENTS

Figure 1:
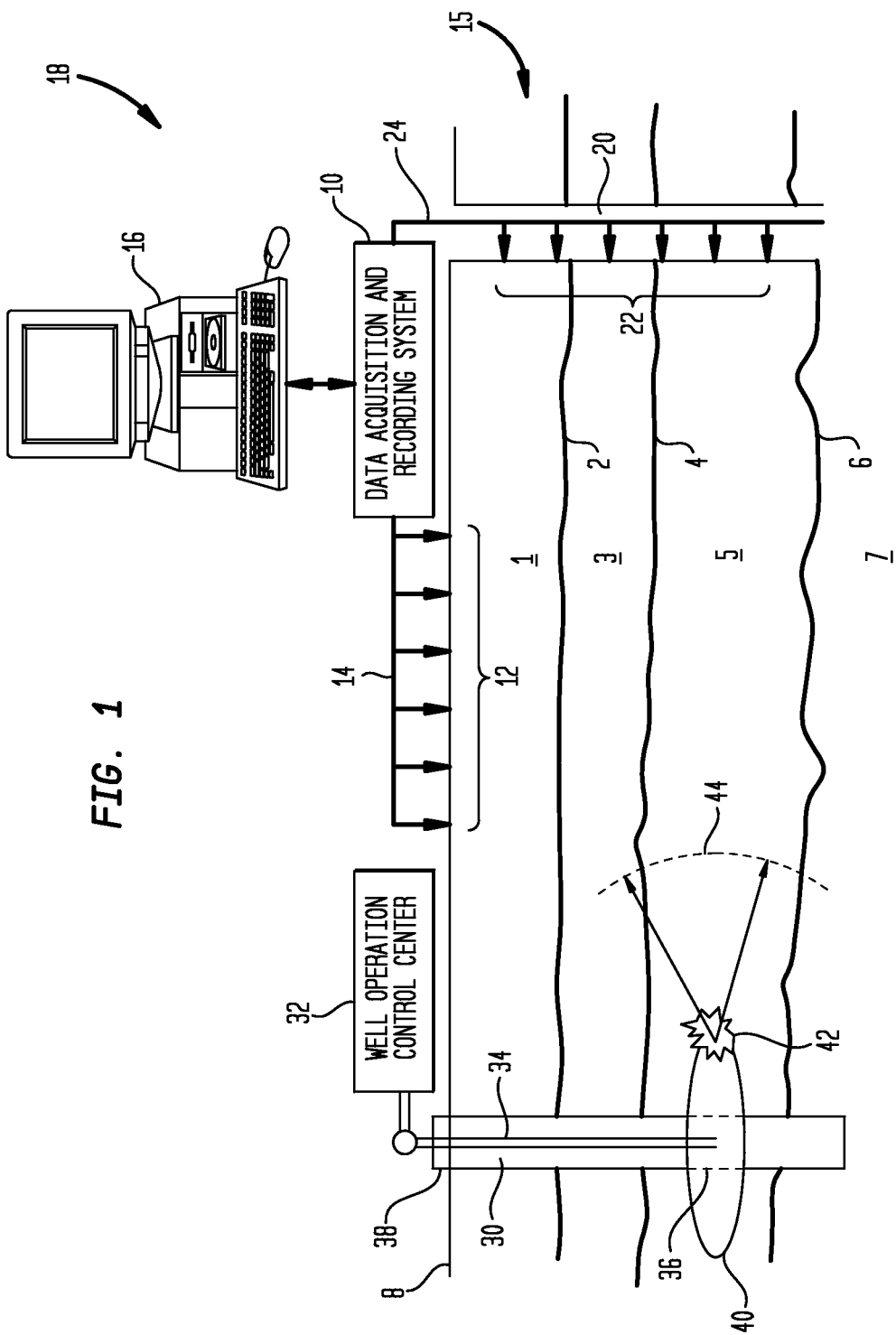
FIG. 1 shows one embodiment of a cross-sectional view of the earth and corresponding data acquisition, recording and analysis system 18.

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well known methods, processes and devices and systems finding application in the various embodiments described herein are not disclosed in detail.

In the drawings, some, but not all, possible embodiments are illustrated, and further may not be shown to scale.

For the first 100 years and more of oil exploration and production, wells were drilled almost exclusively in geologic formations that permitted production of oil and gas flowing under the natural pressures associated with the formations. Such production required that two physical properties of the geologic formation fall within certain boundaries. The porosity of the formation had to be sufficient to allow a substantial reserve of hydrocarbons to occupy the interstices of the formation, and the permeability of the formation had to be sufficiently high that the hydrocarbons could move from a region of high pressure to a region of lower pressure, such as when hydrocarbons are extracted from a formation. Typical geologic formations having such properties include sandstones.

In recent years, it has become apparent that large reserves of hydrocarbons are to be found in shale formations. Shale formations are typically not highly permeable, and therefore present formidable obstacles to production. The most common technique in use today that permits commercial production of hydrocarbons, and especially natural gas from shale formations, is hydraulic fracturing. This technique can be also be applied to older wells drilled through non-shale formations to increase the proportion of hydrocarbons that can be extracted from them, thus prolonging well life.

Hydraulic fracturing involves pumping fluid under very high pressure into hydrocarbon-bearing rock formations to force open cracks and fissures and allow the hydrocarbons residing therein to flow more freely. Usually the fluids injected into such formations contain chemicals to improve flow, and also contain "proppants" (an industry term for substances such as sand). When the fracturing fluid is removed, and the hydrocarbons are allowed to flow, the sand grains prop open the fractures and prevent their collapse, which might otherwise quickly stop or reduce the flow of hydrocarbons.

Drilling technology has evolved to allow wells to be drilled along virtually any direction or azimuth, and is no longer constrained to the drilling of vertical wells only. Deviated wells are thus often drilled along specific geologic formations to increase production potential. The extent of a hydrocarbon-producing formation in a vertical well may be measured in feet, or perhaps tens or hundreds of feet in highly productive areas. The maximum area of the formation in contact with the vertical well bore is quickly computed as the circumference of the well multiplied by the height of the producing formation. In practice, the producing area is much less than this figure. By drilling horizontally or non-vertically through a formation, the extent of the formation in contact with the wellbore can be much greater than is possible with vertically-drilled wells. Injecting deviated wells with hydraulic fracturing fluid can result in the propagation of fractures outwardly from the wellbore, and thereby increase significantly the total volume of the subsurface from which the hydrocarbons can be extracted.

The progress of a fracturing operation must be monitored carefully. Well fracturing is expensive, and the fracturing process is frequently halted once its benefits become marginal. The high pressures associated with fracturing result in fractures that tend to follow existing faults and fractures, and can result in an uneven or unpredictable fracture zone. Fracturing fluid may also begin following an existing fault or fracture zone and then propagate beyond the intended fracture zone. Care must also be taken not to interfere with existing production wells in the area. For these and other reasons, it is important that the fracturing operator be able to follow accurately the progress of the fluid front in the subsurface while the fluid is being injected into the well.

Conventional surface seismic reflection surveys generally do not work well for monitoring the movement or positions of fluid fronts in the subsurface. The physical dimensions of fractures are often shorter than can be detected using conventional surface seismic reflection techniques. In addition, within a given formation there may be no or low contrasts in seismic velocity, and as a result surface seismic reflection techniques cannot be used effectively to image fractures within the formation. Fractures also tend to scatter seismic energy, further obscuring their detection by conventional surface seismic reflection means.

An alternative approach to the problem of imaging fractures or fluid fronts within formations known as "microseismicity" has its origins in earthquake seismology and in technology developed to monitor nuclear tests. Instead of using "active" surface seismic energy sources, "passive seismic" techniques are used to detect seismic energy generated in the subsurface of the earth. Seismic energy emitted by fracturing of a geologic formation, which is caused by the injection of high pressure fracturing fluid into the formation, is sensed and recorded. The objective then becomes determining the point of origin of the emitted seismic energy, which defines the location of the fracture.

One method of locating fractures and faults in geologic formations is known as Seismic Emission Tomography (SET). Examples of SET techniques and processes are described in U.S. Pat. No. 6,389,361 to Geiser entitled "Method for 4D permeability analysis of geologic fluid reservoirs" (hereafter "the '361 patent") and in U.S. Pat. No. 7,127,353 to Geiser entitled "Method and apparatus for imaging permeability pathways of geologic fluid reservoirs using seismic emission tomography" (hereafter "the '353 patent"), the disclosures of which are hereby incorporated by reference herein in their respective entireties.

The SET process entails recording microseismic data using an array of sensors, which are typically located on or near the surface of the earth. Data are recorded over a given time period, with the duration of recording and the sampling interval being controlled by the objectives of the seismic data acquisition process, the characteristics of the events that generate the detected or sensed seismic energy, the distances involved, the characteristics of the subsurface, and other factors. The data recorded at each sensor location are then filtered and processed using SET processing techniques and software, which convert the data into a series of values within gridded subsurface volumes corresponding to multiple time samples. The values of the points in the grid represent attributes of the data, which values vary over time as the energy emitted at each point in the subsurface varies.

Conventional seismic surveys use an active source to send energy into the subsurface of the earth. The timing and characteristics of this energy source are well known. In contrast, microseismic surveys rely on energy from small and usually unpredictable movements of the subsurface. Microseismic energy recorded by seismic sensors on the surface of the earth may have been released by movement of the subsurface along a fault/slip plane. Because the two sides of the fault plane move in opposing directions, the energy emitted on one side is approximately opposite in phase to the energy emitted by the other side. For example, one side of the fault plane may move up, and the other side move down, producing what is referred to as a "double-couple" source. The energy release from such a source is very different from that released by a conventional seismic source, in which explosive, impulsive, vibratory or other means are used to generate a seismic event. The double-couple source energy varies greatly with direction or azimuth, and has very distinct azimuthally dependent phase characteristics. P-waves and S-waves have different azimuthally dependent phase characteristics. P and S waves travel at different velocities. The result is that the propagation of the energy released by the fault motion can differ greatly depending on direction or azimuth.

In a surface microseismic array, sensors are arranged to cover an area of interest. Because the distance, and the direction, from the microseismic event to each sensor is different, the signal from an event recorded at different sensor positions is different in both amplitude and phase. Therefore commonly used methods of enhancing the signal, such as stacking multiple traces recorded at different locations, or computing semblance, do not work well. In order to produce an accurate result, it is necessary to compute and apply azimuthally-dependent corrections for amplitude and phase before stacking or computing semblance.

When processing microseismic data, the subsurface within the area of interest is divided into a 3D grid, each cell or voxel within the grid representing a possible location of the source of a seismic event. Using a known or estimated velocity model, including azimuth information, for each point in the subsurface, the travel time and travel path to each sensor is computed. For each point in the subsurface grid, the trace recorded at each of the N sensor positions has the appropriate travel time shift applied to it. The result is a set of N traces which may be considered to have originated at this voxel.

One objective of some embodiments of the microseismic method as described here is to determine the direction of maximum stress in a geologic formation. This can be determined using information about the orientation of faults and fractures, and about the direction of first motion when a fault or fracture moves. Unlike a conventional seismic source, which ideally radiates seismic energy equally in all directions, a microseismic source typically has a directionality caused by the source mechanism, which results in variations of the energy received at different sensor positions having different azimuths from the source. The process of correcting for these variations includes the steps of determining the orientation of the source and the direction of first motion.

The normal microseismic processing procedure is to stack (sum) the N traces at the voxel, or compute some measure of similarity or coherence, such as semblance. If this voxel indeed represents the origin of a microseismic event, the traces add constructively or show a high degree of similarity. However, the traces are gathered from sensors with different azimuth values from this voxel, and therefore differ in amplitude and phase from one another for the reasons discussed above, even though they may all show energy from the same event. The traces tend to cancel one another, resulting in a low amplitude result leading to failure to identify the microseismic event. If the phase and amplitude differences can be accounted for, it is possible to provide a much more accurate stack or semblance value, after which the microseismic events can be imaged and identified using techniques such as those described in the '353 and '361 patents. In order to compute the amplitude and phase compensation needed, first it is necessary to determine the first motion direction and the orientation of the microseismic event. These parameters are related to the stress direction in the subsurface, and obtaining this information is another useful and valuable result of this process. What is required for optimal microseismic data processing is to apply a azimuthally-dependent phase compensation and amplitude adjustment to the voxel traces, before the stacking is performed or the semblance is computed, based on knowing the azimuth of the sensor from the voxel and computing the orientation of the microseismic event at the voxel.

Referring now to FIG. 1, there is shown a cross-sectional view of the earth in the vicinity of well bores 20 and 30, where hydraulic fracturing fluid is injected into well bore 30 and then into geologic formation 5, and seismic wavefronts and energy 44 emitted at point of fracture 42 caused by the fracturing of geologic formation 5 by the fracturing fluid are sensed by surface sensors 12 disposed along surface 8 and/or downhole sensors 22 disposed in well bore 20. The electrical, magnetic, or optical analog or digital signals generated by sensors 12 and 22 in response to sensing seismic energy or wavefront 44 are representative of the detected or sensed seismic energy, and are recorded as data by acquisition and recording system 10. As further shown in FIG. 1, data acquisition, processing and interpretation/analysis system 18 comprises surface sensors 12 and downhole sensors 22 operably connected to data acquisition and recording system 10, and data processing computer 16 operably connected to data acquisition and recording system 10. Note that FIG. 1 shows only one of many possible embodiments of system 18 for acquiring, processing and interpreting/analyzing microseismic data in a well setting.

In FIG. 1, a hydraulic fracturing operation is shown in progress in wellbore 30. Under the control and direction of well operation control center 32, hydraulic fracturing fluid is pumped into wellbore 30 at high pressure through pipe 34. The high pressure of the pumping operation forces fracturing fluid out of the wellbore 30 and through perforations 36 in wellbore 30 into hydrocarbon producing geologic formation 5. As the fracturing fluid flows outwardly from wellbore 30 and into geologic formation 5, the high pressure of the fluid fractures surrounding formation 5, causing one or more releases of seismic energy at point of fracture 42. This seismic energy propagates through subsurface 15 of the earth as a series of acoustic wavefronts or seismic waves 44, which are then sensed by surface sensors 12 and downhole sensors 22, converted into electrical, optical and/or magnetic analog or digital signals, and recorded by data acquisition and recording system 10 using techniques and equipment well known in the art. In data acquisition, processing and interpretation system 18 of FIG. 1, and according to one embodiment, data may be recorded, processed and analyzed or interpreted while fracturing is occurring, thereby enabling near-real-time monitoring of the fracturing process.

Data acquisition and processing configurations other than that shown in FIG. 1 may be employed. For example, only surface sensors 12 may be employed or only downhole sensors 22 may be employed, and downhole sensors may be employed in well bore 30 in addition to or instead of in well bore 20. Seismic sensors 12 and 22 may be deployed along surface 8 and in well bore 20 and/or well bore 30. Any suitable combination of surface sensors 12 and/or downhole sensors 22 may be employed. By way of example, sensors 12 and 22 may be geophones, accelerometers, piezoelectric sensors, hydrophones, or any other suitable acoustic sensor. One-, two- or three-axis geophones may also be used in sensors 12 on surface 8 or in sensors 22 in well bores 20 and/or 30. Sensors 22 may be cemented in place permanently in well bore 20 or well bore 30, and thereafter used to acquire data for multiple projects. Sensors 22 may also be lowered into well bore 20 on wireline or cable 24. The electrical, magnetic or optical signals from sensors 22 are then transmitted to the data acquisition and recording system 10 along through wireline or cable 24. Note further that data acquisition, processing and interpretation system 18 may be employed in land, marine, off-shore rig, and transition zone settings. In addition, multiple data processing computers 16 may be employed, and/or multiple data acquisition and recording systems 10 may be employed.

Continuing to refer to FIG. 1, seismic energy 44 originating in geologic formation 5 as a result of fracturing caused by the injection of fracturing fluid into formation 5 propagates within a volume of subsurface 15 of the earth through geologic formations 1, 3, 5, and 7, and is received at a plurality of surface and/or downhole sensor locations corresponding to sensors 12 and/or 22 located proximate a volume of subsurface 15 of the earth. Each of sensors 12 or 22 may comprise one or a plurality of sensors, or arrays of sensors, and are typically geophones, although accelerometers and other types of electrical, magnetic and optical sensors may also be used. Note further that sensors 12 and/or 22 may be 1-, 2- or 3-mutually-orthogonal axis sensors, geophones, hydrophones or accelerometers configured to generate electrical, magnetic and/or optical signals proportional to the displacement, velocity or acceleration of the earth at locations corresponding to sensors 12 and 22, where such displacement, velocity or acceleration is caused by seismic wavefront 44 arriving at the locations of sensors 12 and/or 22. The electrical, magnetic or optical signals generated by sensors 12 and/or 22 are transmitted to data acquisition and recording system 10 by cable 14 and wireline or cable 24.

In other embodiments, signals generated by sensors 12 and/or 22 are transmitted by wireless transmitters to a receiver operably connected to data acquisition and recording system 10. In still other embodiments, the electrical, magnetic and/or optical signals generated by sensors 12 and/or 22 are stored as data in solid state or other memory or recording devices associated with one or more sensors 12 and/or 22. The memories or recording media associated with the recording devices may be periodically collected or polled, and the data stored therein uploaded to data acquisition and recording system 10.

Other embodiments include but are not limited to, the recording of the seismic waves created by the energy released by explosive charges during the perforation of wellbore 30. When wellbore 30 is cased with a metal pipe or casing, the casing must be perforated so that oil or gas may flow into pipe 34 and thence to the surface of the earth at wellhead 38. Small explosive charges are used to perforate the casing and create perforations 36 through which oil or gas may then flow.

Still other configurations and embodiments may be employed to locate, measure and analyze faults in the subsurface of the earth by microseismic detection and processing means, such as, for example, sensing, recording and analyzing seismic energy originating from naturally occurring events, such as slippage along faults, settling or tilting of the subsurface, earthquakes, and other naturally-occurring events.

Data recorded by data acquisition and recording system 10 are typically, although not necessarily, in the form of digitally sampled time series commonly referred to as seismic traces, with one time series or seismic trace corresponding to each sensor 12 or 22. Each value in the time series is recorded at a known time and represents the value of the seismic energy sensed by sensors 12 and 22 at that time. The data are recorded over a period of time referred to as the data acquisition time period. The data acquisition time period varies depending on the objective of the seismic survey. When the objective of the survey is to monitor a fracturing operation, for example, the data acquisition time period may be in hours or even days. When the objective of the survey is to acquire data associated with perforating a well, the data acquisition time period is much shorter and may be measured, by way of example, in seconds or minutes.

The rate at which data are recorded for each of the channels corresponding to each of the sensors 12 and 22 may also be varied in accordance with the objectives of the survey, and the frequencies characteristic of the seismic energy generated at point of fracture 42, and seismic wavefront 44 as it propagates through subsurface 15 and to surface 8. For example, if frequencies less than or equal to 125 Hz are expected to be sensed or measured in acoustic wavefront 44, data may be sampled at a rate of 2.0 milliseconds ("ms") per channel to ensure aliasing does not occur. Other sample rates are also possible such as 0.25 ms, 0.5 ms, 1 ms, 4 ms, 8 ms, 16 ms, and so on.

It is usual to record more data than is required for a given survey objective. For example, when monitoring a fracturing operation, recording may begin several minutes before the fracturing operation is scheduled and continue until a time beyond which it is unlikely that any further energy will be released as a result of the fracturing process. Such a process may be used to record the ambient seismic field before and/or after fracturing, production, halt of production, or perforation operations.

Once the seismic data have been recorded, they must be processed and converted to produce a useful display of information. Examples of providing such displays of information may be found in the above-referenced '361 and '353 patents, where some SET data acquisition and processing techniques are described in detail.

In at least some SET techniques and processes, the subsurface of the earth is subdivided into a three-dimensional grid, and the cells in the grid are referred to as "voxels". A "voxel" or "volume element" is the three-dimensional equivalent of a two-dimensional "pixel" or "picture element". While various algorithms may be used to transform the acquired data, the end result is typically the same: a series of SET spatial volumes are produced, where each SET spatial volume is associated with a given data subset, and each data subset corresponds to a given time window. The values corresponding to the voxels within the spatial volume represent the amount of energy emitted from each voxel during a given time window.

The energy emitted from each voxel during a given time window may be represented by different attributes of the data, including, but not limited to, semblance, amplitude, absolute amplitude, reflection strength (the amplitude of the envelope of the seismic wave), phase, frequency, and other attributes of seismic data which will be apparent to those skilled in the art.

The size of the cells in the grid, (i.e. the voxels), is chosen based on the size of the microseismic events to be imaged. The smaller the voxel, the finer the detail which may be distinguished in the subsurface, and therefore the locations of the microseismic events may be determined more accurately. However, increasing the number of voxels increases the computing time required to process the data. Also, the smaller the voxel, the less energy is emitted from a voxel over a given period of time, increasing the difficulty of identifying microseismic events.

Microseismic events are frequently of the type known as a "double-couple". When slip occurs along a fault or fracture, the geologic formations on each side of the fault or fracture move in relatively opposite directions. The initial burst of energy released in any given direction as a result of this motion may be compressional or tensional, depending on the angle of dip of the fault plane, and the direction of motion of the fault. Sensor positions receive different combinations of compressional and tensional first motion energy, as determined by the azimuth of the fault or fracture and the azimuth to the sensor position. It is possible to compute these differences in the recorded signal at different sensor positions at various azimuths, and to compensate for this azimuthally-dependent variation. In some embodiments, the first motion orientation of a microseismic event is determined, and is used to compute an azimuthally-dependent phase shift characteristic of the source mechanism responsible for the microseismic event so that an azimuthally-dependent phase shift compensation can be applied before the microseismic data traces are input to the SET processing or other processing steps. In other embodiments, both an azimuthally-dependent phase compensation and an azimuthally-dependent amplitude adjustment are applied to the microseismic data traces before other processing steps are performed.

Referring now to FIG. 2, there is shown one embodiment of a method 200 for determining the principal fracture orientation at a point in the subsurface by a process of computing and applying a phase compensation to optimize the alignment of the traces corresponding to the microseismic energy which may have originated at that point in the subsurface. The steps in this embodiment and other embodiments are described in more detail below.

As shown in FIG. 2 at step 204, microseismic data are acquired over the subsurface volume of interest, using surface sensors 12 disposed along surface 8 and/or downhole sensors 22 disposed in well bore 20, or both surface sensors 12 and downhole sensors 22 as previously described.

Still referring to FIG. 2, at step 208, according to some embodiments, the subsurface volume is divided into a 3D grid, each cell or voxel within the grid representing a possible location of the source of a seismic event. This is known as "voxel space". The dimensions of the cells or voxels are determined by the geometry of the sensor positions, and the dimensions of the faults and fractures which are to be imaged using the microseismic technique. The microseismic data traces received at the surface or downhole sensors are converted to voxel space by computing the travel time through the subsurface, using a known or estimated velocity field, from the voxel to each sensor position, and then time-shifting the microseismic data traces received at the surface or downhole sensors by the computed travel time. The result is a set of time shifted microseismic data traces for each voxel which might have been generated by the release of seismic energy at this voxel. This set of time shifted data traces is referred to as a "voxel gather".

The microseismic processing procedure previously employed at this point is to stack (sum) the time shifted microseismic data traces within a voxel gather, or compute some measure of their similarity, such as semblance. If this voxel indeed represents the origin of a microseismic event, the time shifted microseismic data traces add constructively or show a high degree of similarity. However, the time shifted microseismic data traces are gathered from sensors with different azimuth values from this voxel, and therefore differ in amplitude and phase from one another for the reasons discussed above, even though they may all show energy from the same microseismic event. In some embodiments of the current method, one objective is to compensate for these phase differences before the stacking is performed or the semblance is computed. In some embodiments, an amplitude adjustment is also made. This provides a more accurate stack or semblance value, after which the microseismic events are located and imaged using techniques such as those described in the '353 and '361 patents.

Continuing to refer to FIG. 2, at step 212, a direction is assigned as zero azimuth. In some embodiments, the conventional definition of zero azimuth as true north is used. Other embodiments may assign different directions as zero azimuth, including a direction corresponding to the orientation of some major geological trend in the subsurface.

Continuing to refer to FIG. 2, at step 216 a Sykes diagram is computed for a voxel assuming a vertical fault plane, with vertical first motion. Applying this Sykes diagram to the microseismic data traces corresponding to this voxel, the microseismic data traces are assigned as compressional or tensional first motion at step 220. A phase compensation is applied at step 224, based on the azimuth from the voxel to the sensor position corresponding to each microseismic data trace. In some embodiments, an amplitude adjustment is also applied. The traces are then stacked and the maximum stack value is recorded. At step 228, the direction of first motion is rotated through a first predetermined angle of rotation about a horizontal axis perpendicular to the fault plane, and the process of computing the Sykes diagram, applying a phase compensation, stacking and determining the maximum stack value is repeated until the direction of first motion has been rotated through a first predetermined arc of rotation as shown at step 240.

In FIG. 2, at step 232, the fault plane is rotated about the vertical axis by a second predetermined angle of rotation, and the above process is repeated until the fault plane has been rotated through a second predetermined arc of rotation as shown at step 236. At step 244, the direction of rotation of the fault plane and the direction of first motion which produces the highest stack value is determined. This defines the principal fault or fracture orientation, which is related to the direction of maximum stress at the voxel. At step 248, azimuthally-dependent phase compensations are computed for voxel-sensor position pairs, and the phase compensations are applied to the time shifted microseismic data traces to account for the azimuthal dependency of the microseismic data traces recorded at the plurality of sensor positions.

Additional steps may be performed according to other embodiments of this method, including filtering to enhance the quality of the data, filtering to remove organized noise, and other signal enhancements which will be understood by those skilled in the art after reading this specification. These additional steps may be performed before, concurrent with or after any of the steps shown in FIG. 2. Further, the order of some of the steps shown in FIG. 2 may be changed, as those skilled in the art will understand after reading this description.

Some additional steps that may be included in some embodiments of the method shown in FIG. 2 include one or more of stacking the compensated time shifted data traces to create a stacked output trace at each voxel, using the stacked output traces to compute the locations of hypocenters of the microseismic events, computing the semblance of the compensated time shifted data traces and computing estimates of permeability as described in the '361 and '353 patents, and computing the semblance or other attributes of the compensated time shifted data traces as inputs to the skeletonization and tomographic fracture imaging process as described in U.S. Patent Application No. 13070442, entitled "Fracture Imaging Methods Employing Skeletonization of Seismic Emission Tomography Data" to Geiser et. al., filed on Mar. 23, 2011, hereinafter "the Geiser application", the disclosure of which is hereby incorporated by reference herein in its entirety.

Figure 3B:
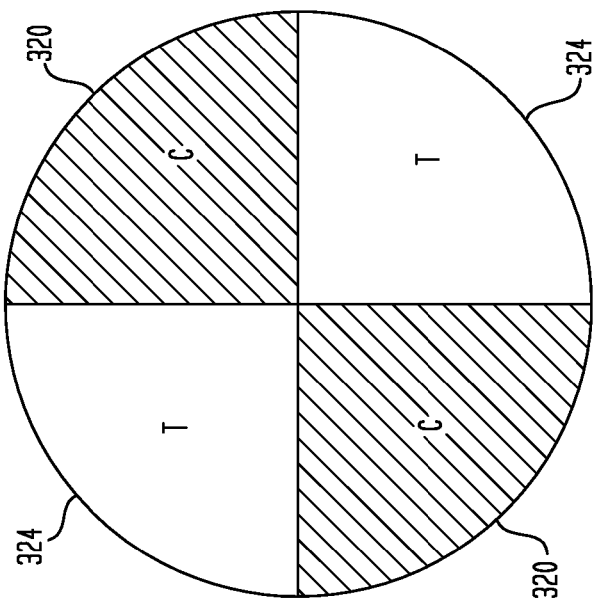
FIGS. 3(a) and 3(b) shows a schematic of a fault or fracture focal mechanism using the conventional display method known as a "beach-ball" display.
Figure 3A:
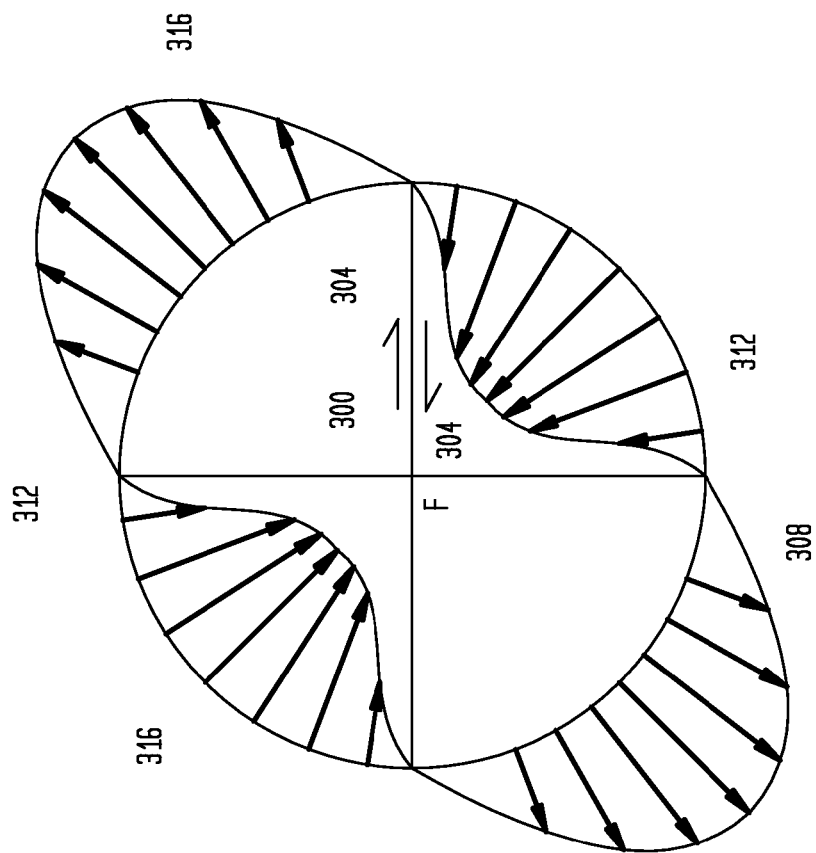

Referring now to FIG. 3(a), there is shown a simple example of a display of a fault movement as seen from directly above. The type of fault shown in FIG. 3(a) is referred to as a strike-slip fault, and is shown with a vertical fault plane. The geologic formations on either side of the fault move relative to one another. The direction of movement of the fault is confined to a horizontal direction substantially parallel to the surface of the earth. There is no vertical motion of the geologic formations. The fault is focused at point 300 with the initial direction of motion shown at 304. The fault motion is referred to as "dextral" because when viewed from either side of the fault, the other side appears to shift to the right. A motion to the left would be referred to as "sinistral". Zones of compression 308 and tension 312 are shown, and the direction of the initial motion of the particles is shown by arrows 316.

Shown in FIG. 3(b) is a Sykes Diagram, commonly referred to as a "beach-ball" diagram, corresponding to the strike-slip fault shown in FIG. 3(a). The Sykes diagram depicts a sphere surrounding a point in the subsurface at which a fault is occurring, as viewed from directly above, with the zones of compression shown shaded at 320, and the zones of tension shown unshaded at 324. Geophysicists use these diagrams to enable easy visualization and comparison of double-couple events.

FIGS. 4(a)-4(f) show further examples of different types of fault movement and their corresponding Sykes diagram or "beach-ball" depictions. FIG. 4(a) shows normal fault 402 viewed from the side, with fault plane 404, projection of the fault plane 406, and auxiliary plane 408, which is at a ninety degree angle to fault plane 404. Direction of motion of the fault is shown at 410. In all the Sykes diagrams in FIGS. 4(a)-4(f), zones of compression are shown shaded and zones of tension shown unshaded. FIG. 4(b) shows Sykes diagram 412 corresponding to the normal fault of FIG. 4(a), with fault plane 404 and auxiliary plane 408.

FIG. 4(c) depicts north west-south east dextral strike-slip fault 420. The corresponding Sykes diagram 422 is shown with zones of compression 424 and tension 426. Because of symmetry Sykes diagram 422 also corresponds to south west-north east sinistral fault 428. This is a limitation of using a Sykes diagram to detect the source mechanism in the absence of other information.

FIG. 4(d) depicts a very common type of fault, "normal" fault 440, in which one block of subsurface 442 has moved down relative to adjacent block 444, or block 444 has moved up relative to block 442. The corresponding Sykes diagram is shown at 446. Again, because of symmetry, this Sykes diagram could also be interpreted as normal fault 448.

FIG. 4(e) shows "reverse" fault 450, also known as a "thrust" fault. In this case block 452 has been thrust up over adjoining block 454. The corresponding Sykes diagram 456 is shown, and the alternate interpretation 458 of the Sykes diagram 456.

FIG. 4(f) shows an "oblique reverse" fault. Faults and fractures rarely happen as simply as the above examples, in which all the motion is horizontal or vertical or in the direction of the dip of a sloping fault. Oblique reverse fault 460 has one block 462 moving relative to adjoining block 464 both up dip direction 472 and horizontally at right angles to dip direction, that is, in the strike direction 476, at the same time. The Sykes diagram corresponding to this motion is shown at 466, with the alternate interpretation of Sykes diagram 466 shown at 468. Sykes diagram 466 for the oblique reverse fault is far more complex than the simple Sykes diagram 422 for the strike-slip fault.

Moving now to FIG. 5, shown at 502 are a plurality of sensor positions as viewed from above. This figure will be used as the basis for following figures, but it is highly simplified. In actual practice, many more sensor positions would likely be used in a microseismic survey, and they might be arranged in a less regular pattern to accommodate rugged terrain, for example. An irregular array does not create problems for the analysis of the recorded data provided that the coordinates of each sensor position are known accurately, enabling the computation of the azimuth of the sensor position from any voxel in the subsurface. Circle 504 corresponds to the view from above of the sphere of the Sykes diagrams shown in the following figures. This view represents both the sensor array and a Sykes diagram viewed from above but does not represent the projection of the sensor positions onto the sphere of the Sykes diagram.

The following Figures show some simplified faults and some techniques which may be employed to determine the orientation of the fault and direction of first motion. These are provided only as examples to introduce the concepts employed in some embodiments of the method, and should not be taken as describing the method, one benefit of which is to overcome the limitations of the following simplified techniques.

In the following discussion of FIGS. 6-10, the term "azimuthal correction" should be understood to include the options of either a phase compensation only, or a phase in combination with an amplitude compensation. In the description of FIGS. 6-10, the microseismic data traces are described as being stacked, but other attributes of the data may be computed.

As can be seen from FIGS. 6 through 10, the compression and tension zones created by generalized faults depend on the type of fault and the direction of motion along that fault. The acoustic energy radiation patterns created by these faults are given by Aki and Richards, Quantitative Seismology, Second Edition, University Science Books, 2002, pp. 108-109, and involve parameters for the dip and strike of the fault, the motion along the fault plane, and take-off angle of the ray associated with the seismic event, in addition to the azimuthal direction between the event and the sensor.

For any subsurface focus location at which a microseismic event may have occurred, it is possible to map each corresponding sensor location on the surface onto an equal-area stereonet (i.e., a Sykes diagram). Also given a focus location, it is possible to correct seismic trace amplitudes as recorded at the sensors for spherical spreading of the acoustic wavefront created by the microseismic event.

In the case of microseismic data, as with earthquake data, dip, strike, and motion along the fault plane are unknown. Take-off angle can be estimated if the acoustic velocity field between the event focus and the sensor is known, and the azimuth between focus and sensor is known.

In some embodiments, the above described methods are used to scan through a library of all possible microseismic events and their corresponding Sykes diagrams, making appropriate amplitude and phase corrections to the traces from each of the sensors, and then computing an attribute based on these corrections. Stack power is one such attribute function which is well known in the geophysical community. The Sykes diagram which produces the maximum attribute result is then assigned to that microseismic event. The ability to calculate and map the microseismic events and their corresponding Sykes diagrams is important to understanding the orientation and motion of the fracture that created the events. In turn, understanding the orientation and motion of fractures in the rock aids in determining the direction of maximum horizontal stress in the formation being fractured, and other information important to execution of a successful fracturing operation, such as the possible existence of faults which interact with the fracturing operation. This general method can be simplified to include the cases of strike-slip vertical faults (FIGS. 3 and 7), and also the case of vertical displacement along a vertical fault, which is rarely seen in nature (FIG. 6).

Figure 6A:
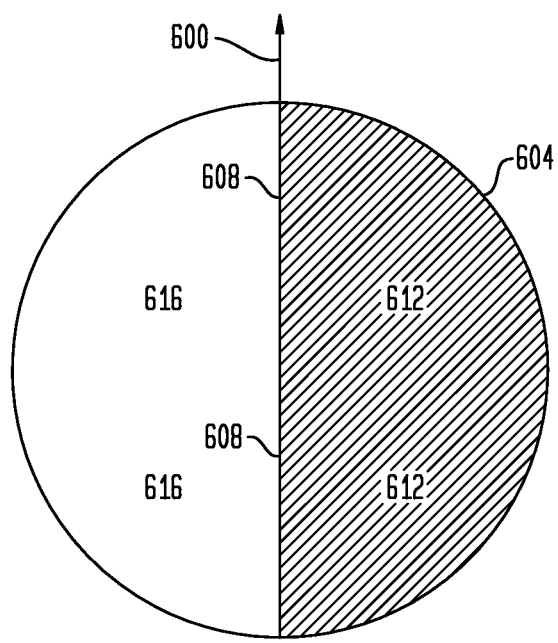
FIGS. 6(a) and 6(b) show Sykes diagrams for a vertical fault motion.

FIG. 6(a) shows Sykes diagram 604 for a trivial case of a vertical fault, at zero azimuth 600 with vertical motion only and no horizontal motion or tilting. Although a pure vertical fault movement is unlikely to occur in actual practice, it is shown here to aid in the understanding of the various embodiments of the described method. A vertical fault can be thought of as a normal fault, like that shown in FIG. 4(c), but with vertical fault plane 608. The geologic formations on one side of the fault plane have a relative upward movement, while the geologic formations on the other side of the fault plane have a relative downward movement. For vertical fault movement, Sykes diagram 604 divides compressional zone 612 and tensional zone 616 into two semicircles as seen from above. Compressional zone 612 is shown shaded. In this view from above, it can be seen that the sensor positions that map to the shaded part of the circle record the first motion as a compressional signal, which is caused as one side of the vertical fault moves upwards and out of the plane of the illustration, toward the observer. The sensor positions that map to non-shaded part 616 of the circle record the first motion as a tensional signal, caused as that side of the vertical fault moves downwards and away from the observer. The process of assigning microseismic data traces to compressional zone 612 or tensional zone 616 is referred to as "binning." FIG. 6(a) shows that for this type of fault, there are two bins, 612 and 616, each representing one half of the upper hemisphere of a sphere. The lower hemisphere is not considered in these techniques, as all the sensor positions 502 are proximate the surface of the earth and are above the voxel at which Sykes diagram 604 is centered.

Continuing to refer to FIG. 6(a), if vertical fault motion corresponding to Sykes diagram 604 were to occur at a voxel located below sensor positions 502, and energy from this fault were recorded by sensor positions 502, then a simplistic approach would be to apply a phase compensation of one hundred eighty degrees to convert the microseismic data traces corresponding to sensor positions with an azimuth within tensional zone 616 to match the phase of the microseismic data traces corresponding to sensor positions with an azimuth within compressional zone 612. However, the actual signal received at different sensor positions varies in both amplitude and phase according to the azimuth from the voxel to the sensor position. A more accurate approach is therefore to apply an azimuthally-dependent amplitude compensation designed for each sensor position and voxel pair to the microseismic data traces to remove the azimuthal variations.

Figure 6B:
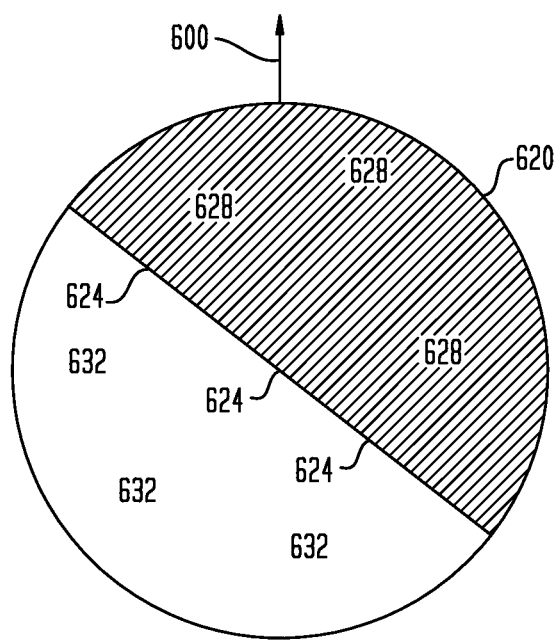

FIG. 6(b) shows Sykes diagram 620 for a vertical fault in which fault plane 624 does not align with selected zero azimuth direction 600. Although the sensors for a microseismic survey may be laid out in a pattern which aligns with the major fault orientation in an area, this is not always possible or practical. Other considerations may also influence the layout of the sensors, including the direction of the horizontal drilling from a central well, especially when the horizontal bores are to be fractured as described above. Compressional first motion bin 628 and tensional first motion bin 632 are shown. In the example of FIG. 6(b), applying a azimuthal correction based on Sykes diagram 604 to a fault with fault plane 624 would result in many of the microseismic data traces being assigned to the wrong first motion bin, and therefore an incorrect azimuthal correction applied.

Before applying any correction, the actual orientation of the fault plane or fracture is determined. This is done for the simple example shown by a process of starting at zero azimuth 600, applying an azimuthal correction using a binning model derived from Sykes diagram 604, stacking the microseismic data traces, and noting the maximum amplitude of the stacked trace. The binning model is then rotated about the vertical axis through a predetermined angle, and the process of applying an azimuthal correction and stacking repeated, until the binning model has been rotated through one hundred eighty degrees. The angle of rotation which produces the highest amplitude for the stacked data indicates the orientation of the fault.

Figure 7A:
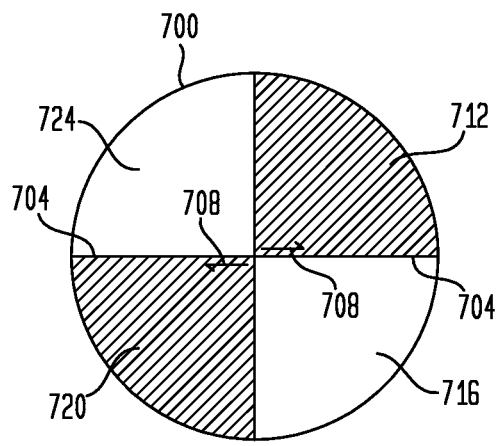
FIGS. 7(a) through 7(d) show Sykes diagrams for a strike-slip fault.
Figure 7B:
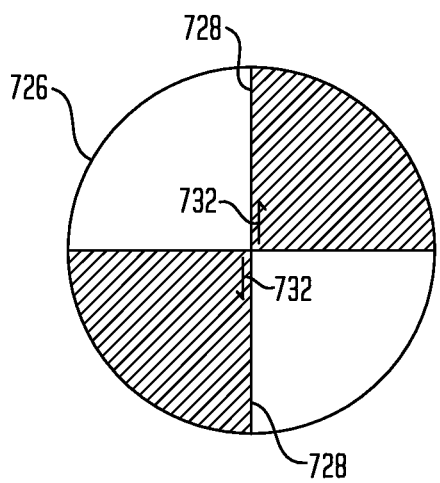
Figure 7C:
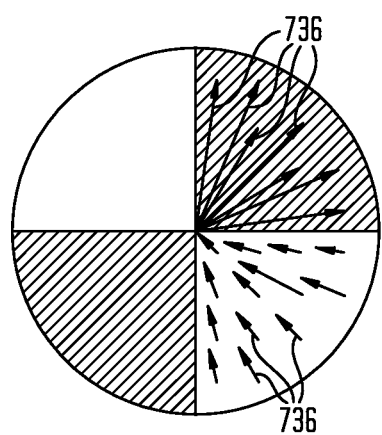

Referring now to FIGS. 7(a)-7(d), another example is shown to illustrate the principles employed in some embodiments of this method. FIG. 7(a) shows Sykes diagram 700 for strike-slip fault 704, with motion 708 of fault 704 seen from above. For strike-slip fault 704, Sykes diagram 700 shows first quadrant 712, second quadrant 716, third quadrant 720 and fourth quadrant 724, with compressional first motion appearing in opposing quadrants 712 and 720. Tensional first motion appears in opposing quadrants 716 and 724. This is an east-west dextral strike-slip fault, and all the motion 708 is in a horizontal direction. FIG. 7(b) shows Sykes diagram 726 with corresponding north-south sinistral fault 728 and motion 732. FIG. 7(c) shows as arrows 736 first motion direction as detected at the sensor arrays for either east-west dextral fault 704 or north-south sinistral 728 fault.

Figure 7D:
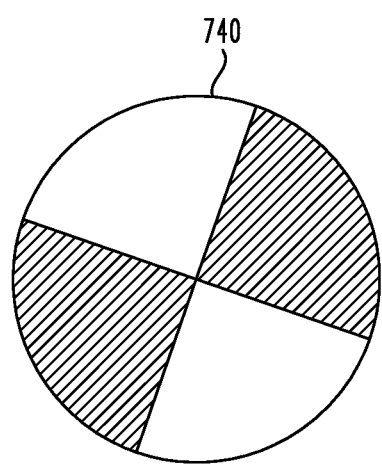

As shown in FIG. 7(b), in order to find the orientation of a strike-slip fault, an extension of the binning approach described above is used. Sykes diagram 726 is computed assuming strike-slip fault 728 with a vertical fault plane at zero azimuth. The sensor positions are assigned to tensional or compressional bins using the quadrants 712, 716, 720, 724 of Sykes diagram 700, an azimuthal correction is applied to the microseismic data traces and the microseismic data traces are stacked. Sykes diagram 726 is rotated about a vertical axis through a series of predetermined angles, as shown in FIG. 7(d) at 740, and the process repeated. The rotation of Sykes diagram 726 which produces the highest stack value provides the orientation of the fault.

It is apparent from the bilateral symmetry of strike-slip fault 704, as shown in FIG. 7(a), that attempting to determine the orientation of a strike-slip fault using the approach described above for a vertical fault, with the Sykes diagram 604 bisected into equal hemispheres, and one hemisphere phase corrected, always results in the microseismic data traces cancelling out, regardless of the orientation of the Sykes diagram hemispheres. It is therefore not possible to use a vertical fault model to determine the orientation of a strike-slip fault.

Applying strike-slip fault Sykes diagram 700 to a vertical fault 608 also results in the microseismic data traces cancelling one another when stacked, thus it is not possible to determine the orientation of such a vertical fault using the quadrant approach designed for strike-slip faults.

Figure 8A:
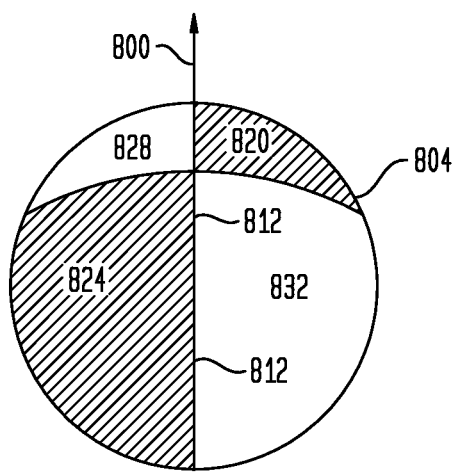
FIGS. 8(a) through 8(d) show Sykes diagrams for an oblique fault.
Figure 8B:
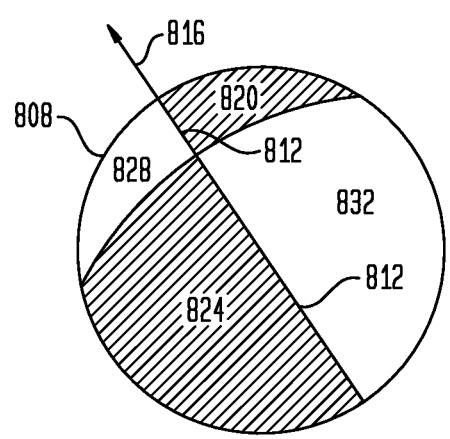

Referring now to FIGS. 8(a) and 8(b), there are shown approximations of Sykes diagrams 804 and 808 for an oblique fault, where the direction of initial motion is substantially equal in the vertical and horizontal directions such that the direction of motion is approximately at a forty five degree angle to the horizontal and vertical axes of the fault plane. FIG. 8(a) shows an oblique fault in which fault plane 812 is vertical and aligned with zero azimuth 800. FIG. 8(b) shows an oblique fault in which fault plane 812 is vertical and is at non-zero azimuth 816. As shown in Sykes diagrams 804 and 808, compressional bins 820 and 824 and tensional bins 828, 832 are offset from the center of the diagram.

Figure 8C:
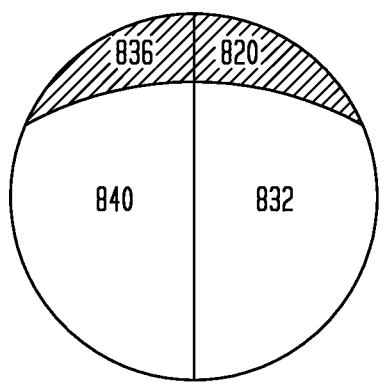

FIG. 8(c) shows the result of assuming a vertical fault motion and applying to an oblique fault a binning model and azimuthal correction for a vertical motion of a vertical fault at zero azimuth as previously described with respect to FIG. 6, with Sykes diagram 604. The microseismic data traces corresponding to tensional bin 828 have an azimuthal correction applied so that they now appear as having compressional first motion 836. The microseismic data traces corresponding to compressional bin 824 have an azimuthal correction applied so that they may now appear as having tensional first motion 840. Because this binning model does not match the actual distribution of compressional and tensional first motions of the oblique fault, some of the microseismic data traces have the wrong azimuthal correction applied. Although the stacked traces to some extent cancel one another, as both compressional and tensional first motions are still present, the net result is a stacked trace of significant amplitude with a maximum value when the rotation of the hemispherical bins matches the azimuth of the fault plane. The stack may be less than optimal, but in this example shows an overall tensional first motion. When fault plane 812 is aligned at non-zero azimuth 816, Sykes diagram 604 being tested must be rotated to non-zero azimuth 816 in order to optimize the stack.

Figure 8D:
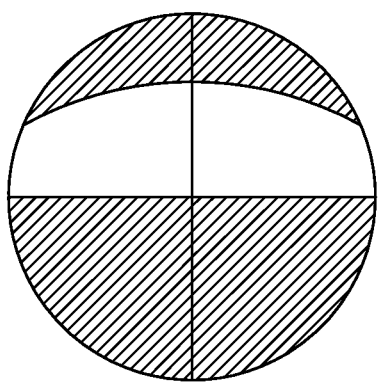

FIG. 8(d) shows that the same analysis applies when the binning model and azimuthal correction are designed using the strike-slip fault model and corresponding Sykes diagram 700, with the quadrants 712, 716, 720 and 724 rotated to achieve a maximum value for the stacked microseismic data traces and an azimuthal correction applied in quadrants 716 and 724. Using this binning model, the stacked traces to some extent again cancel one another, as there are both compressional and tensional first motions still present. The result is a stacked trace of significant amplitude, with a maximum value when the rotation of the quadrant bins matches the azimuth of the fault plane. Neither the vertical fault Sykes diagram 604 nor the strike-slip Sykes diagram 700 produces a clear indication of the fault direction with a high degree of confidence.

Figure 9A:
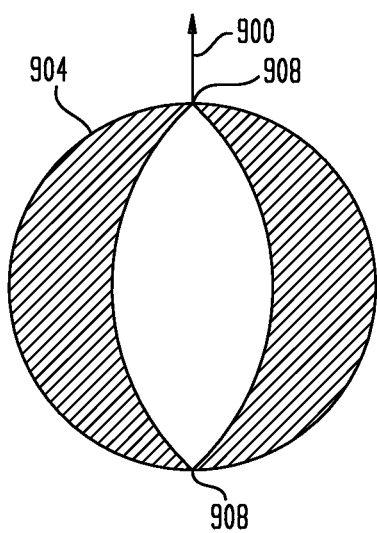
FIGS. 9(a) through 9(d) show Sykes diagrams for a normal fault.
Figure 9B:
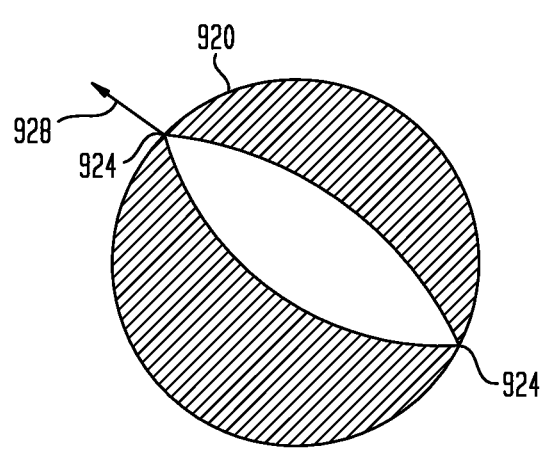

Moving now to FIGS. 9(a)-9(d), examples are shown of Sykes diagrams for tilted normal faults. As discussed above, faults and fractures in actual practice rarely occur as pure vertical or horizontal faults. Unlike a vertical fault, which occurs in a vertical fault plane, normal faults occur when geologic formations move along fault planes that are at an angle to the vertical. FIG. 9(a) shows Sykes 904 diagram for tilted normal fault 908, as previously shown in FIG. 4(d), which has a fault plane aligned with zero azimuth 900. Such an alignment happens infrequently, and a more typical case is shown in Sykes diagram 920 in FIG. 9(b), where tilted normal fault 924 is at orientation 928 not aligned with the sensor array. Normal fault 908 in FIGS. 9(a) and 9(b) is tilted at a dip angle close to forty five degrees, which results in equal zones of compression and tension on either side of a the vertical plane.

Figure 9C:
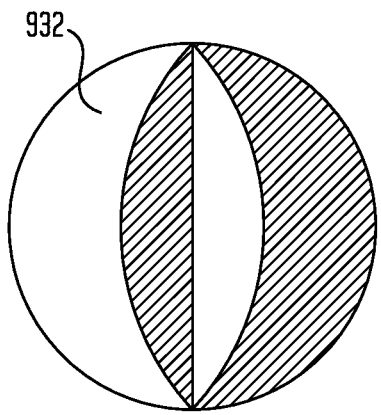
Figure 9D:
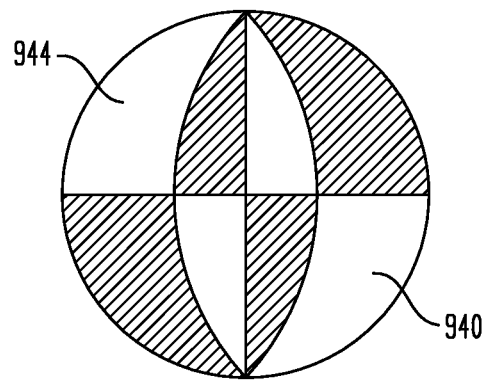

Using a binning model based on Sykes diagram 604 for a vertical fault, (as was shown in FIG. 6(a),) and applying an azimuthal correction to microseismic data traces in compressional hemisphere 932 as shown in FIG. 9(c), and then stacking all of the traces results in a zero output, showing the limitations of assuming that the fault motion is entirely vertical in a vertical fault plane. Similarly, using the binning model based on Sykes diagram 700 for a strike-slip fault, (as was shown in FIG. 7(a),) and applying an azimuthal correction to the microseismic data traces in compressional quadrants 940 and 944 as shown in FIG. 9(d), and then stacking all of the traces results in a zero output, showing the limitations of assuming that the fault motion is entirely a horizontal motion of a vertical fault plane. A normal oblique fault with a dip angle of forty five degrees may not be detectable using the simplified assumption of a vertical fault plane and vertical or horizontal motion. More advanced techniques used to identify this fault orientation and apply a phase compensation are discussed further below.

In FIG. 6(a) there is shown a Sykes diagram for vertical motion in a vertical fault plane that is equally applicable, according to the principles of symmetry, to horizontal motion in a horizontal fault plane. In most locations in the subsurface the direction of maximum stress, which controls the motion of faults, is close to vertical because of the weight of the overlying geological formations. In fracturing operations, horizontal motion of a horizontal fracture is sometimes observed. Therefore some assumptions based on other geological or geophysical data must be made about the orientation of the fault in order to remove the ambiguity introduced by the symmetry of the possible solutions.

Figure 10:
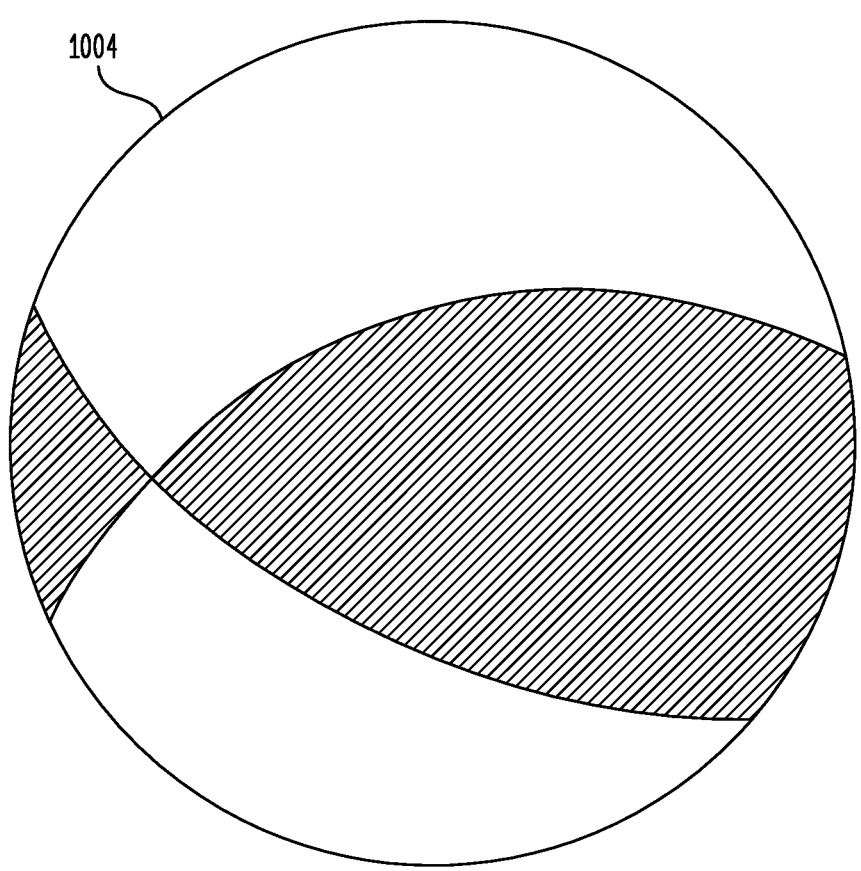
FIG. 10 shows a Sykes diagram for a reverse oblique fault.

Referring now to FIG. 10, there is shown Sykes diagram 1004 for a reverse oblique fault. The reverse oblique fault, as illustrated above in FIG. 4(f), features both vertical and horizontal movements along a fault plane which has a significant dip angle. When a Sykes diagram becomes this complex, the simplifying assumptions made in the above examples are no longer applicable. The complex fault corresponding to Sykes diagram 1004 of FIG. 10 is more typical of faults and fractures found in the real world.

One of the objectives of some embodiments is to determine the direction of first motion of the particles in the subsurface where a microseismic event has occurred. Another objective is to determine the orientation of a fault plane or fracture where a microseismic event has occurred. In some embodiments, the orientation of the fault is determined using an initial assumption that the fault plane is vertical, which may later be refined.

Figure 11:
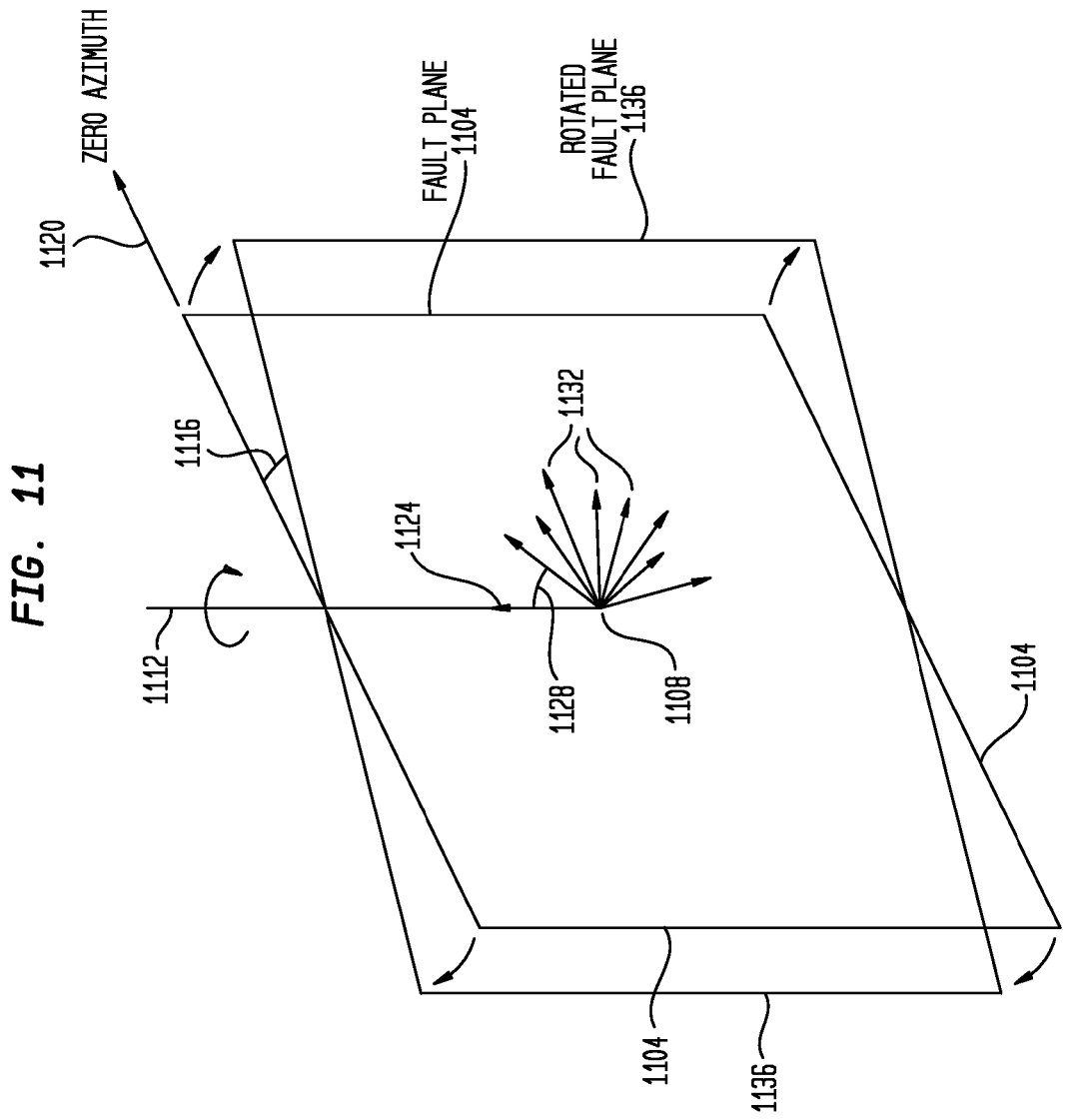
FIG. 11 shows one embodiment of a method for determining the azimuth and direction of first motion of a fault.
Figure 12A:
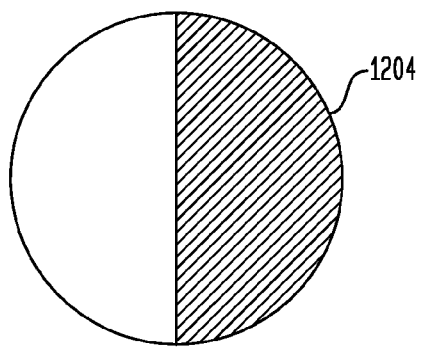
FIGS. 12(a) through 12(f) show Sykes diagrams for one embodiment of a method for determining the azimuth of a fault.
Figure 12B:
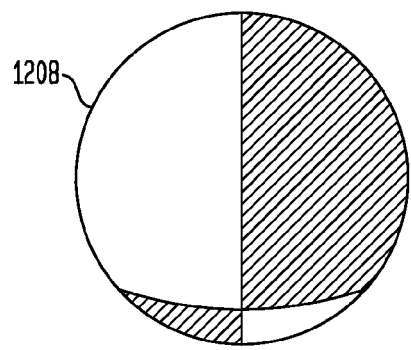
Figure 12C:
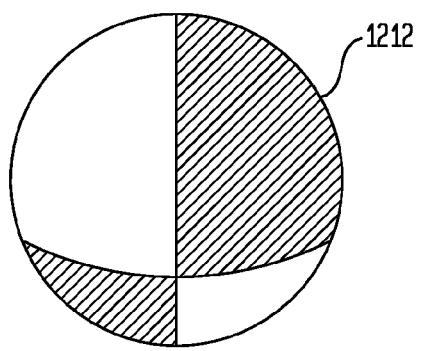
Figure 12D:
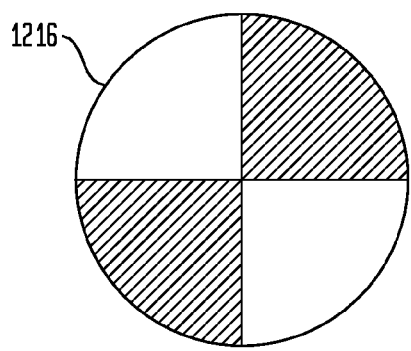
Figure 12E:
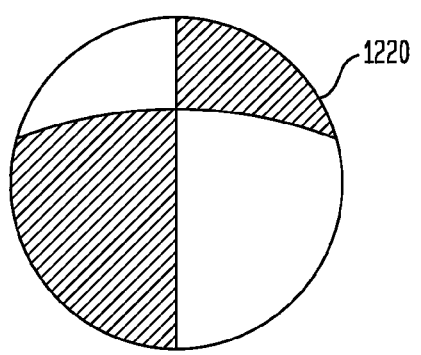
Figure 12F:
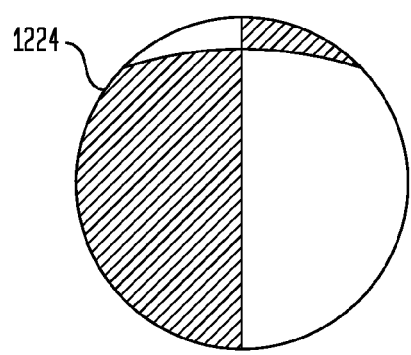
Figure 13A:
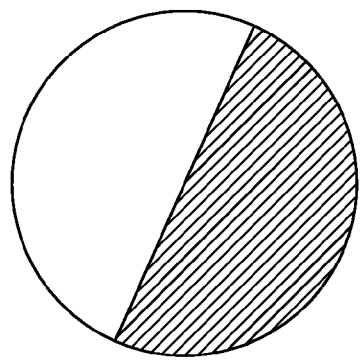
FIGS. 13(a) through 13(f) show Sykes diagrams for one embodiment of a method for determining the azimuth of a fault.
Figure 13B:
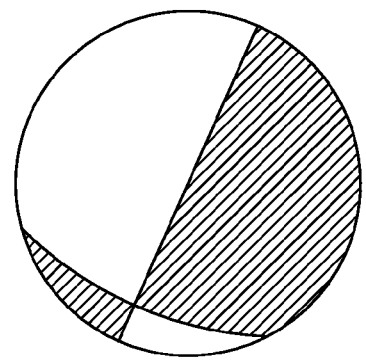
Figure 13C:
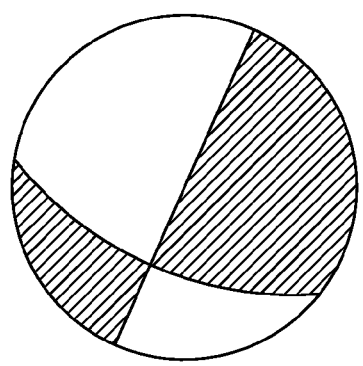
Figure 13D:
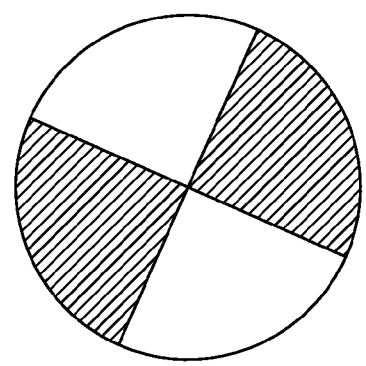
Figure 13E:
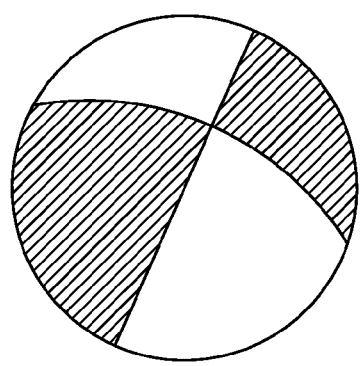
Figure 13F:
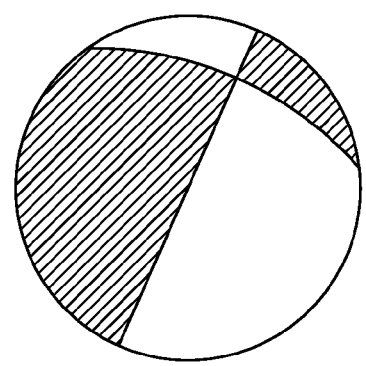

FIG. 11 shows vertical fault plane 1104 centered on voxel 1108 with a vertical axis 1112 through voxel 1108. Fault plane 1104 is aligned at zero azimuth 1120. In some embodiments, Sykes diagram 1204 as shown in FIG. 12(a) is created assuming vertical fault plane 1104 aligned at zero azimuth 1120, and vertical direction of first motion 1124. As discussed above, Sykes diagram 1204 is used to assign microseismic data traces at voxel 1108 to a compressional bin or a tensional bin. An azimuthally-dependent correction is applied to microseismic data traces at voxel 1108. In some embodiments, the microseismic data traces at voxel 1108 have an azimuthally-dependent phase compensation designed and applied for each microseismic data trace based upon the azimuth of the sensor position corresponding to the microseismic data trace. In yet other embodiments, both an azimuthally-dependent phase compensation and an azimuthally-dependent amplitude adjustment are applied. In some embodiments, an attribute of the microseismic data traces is computed, the microseismic data traces are stacked, and the maximum value of the stack is recorded. In still further embodiments, the semblance of the microseismic data traces is computed, and the maximum value of the semblance is recorded. In yet other embodiments, the microseismic data traces are stacked, the semblance is computed, the stack and semblance values are multiplied to provide a semblance-stack value, and the maximum value of the semblance-stack is recorded.

Continuing to refer to FIG. 11, in some embodiments the direction of first motion is rotated by first predetermined angle of rotation 1128 about a horizontal axis through the voxel and perpendicular to the fault plane, the rotation being in the plane of the fault, so that the direction of first motion has a vertical component and a horizontal component within the plane of the fault as shown at 1132. Sykes diagram 1208 is recomputed for this configuration, and looks substantially like FIG. 12(b). Sykes diagram 1208 is again used to assign the microseismic data traces at the voxel to a compressional bin or a tensional bin. The same type of azimuthally-dependent correction used previously is applied to the microseismic data traces. The same attribute of the traces is computed, and the maximum value recorded. The direction of first motion is rotated again through the first predetermined angle of rotation 1128, and the process is repeated until the direction of first motion has been rotated through a predetermined first arc of rotation. A sampling of the Sykes diagrams 1204, 1208, 1212, 1216, 1220 and 1224 for the various angles of rotation is shown in FIGS. 12(a) through 12(f).

Fault plane 1104 is then rotated about vertical axis 1112 through second predetermined angle of rotation 1116 so that fault plane 1104 is now aligned as shown at 1136. The foregoing process is repeated with the direction of first motion varying from vertical through the first predetermined arc of rotation. The fault plane is rotated again about the vertical axis 1112 through the second predetermined angle of rotation 1116, and the above process repeated, until the fault plane 1104 has been rotated about the vertical axis 1112 by a second predetermined arc of rotation. Examples of Sykes diagrams for various angles of rotation and a non-zero azimuth fault plane are shown in FIGS. 13(a) through 13(f). The azimuth of fault plane 1104 and the angle of first motion which correspond to the rotation at which the maximum value of the attribute of the microseismic data traces at voxel 1108 occurs are determined.

Referring again to FIG. 11, in some embodiments the first rotation is that of the direction of first motion and the second rotation is that of fault plane 1104. In some other embodiments, the first rotation is that of fault plane 1104, and the second rotation is that of the direction of first motion. It will now become apparent to those skilled in the art upon reading this description that the order in which the two rotations are applied has no effect on the results and produces an identical result.

Still referring to FIG. 11, in some embodiments the predetermined arc of rotation applied to the direction of first motion is one hundred eighty degrees starting at a vertical orientation and the predetermined arc of rotation applied to the fault plane is one hundred eighty degrees starting at zero azimuth. In other embodiments, the predetermined arc of rotation applied to the direction of first motion is ninety degrees starting at a vertical orientation and the predetermined arc of rotation applied to the fault plane is three hundred sixty degrees starting at zero azimuth.

As described above, FIGS. 12(a)-12(f) show Sykes diagrams corresponding to fault plane 1104 at zero azimuth 1120 with different directions of first motion. FIGS. 13(a)-13(f) show Sykes diagrams corresponding to fault plane 1104 rotated about vertical axis 1112 away from zero azimuth 1120, with different directions of first motion.

Figure 14:
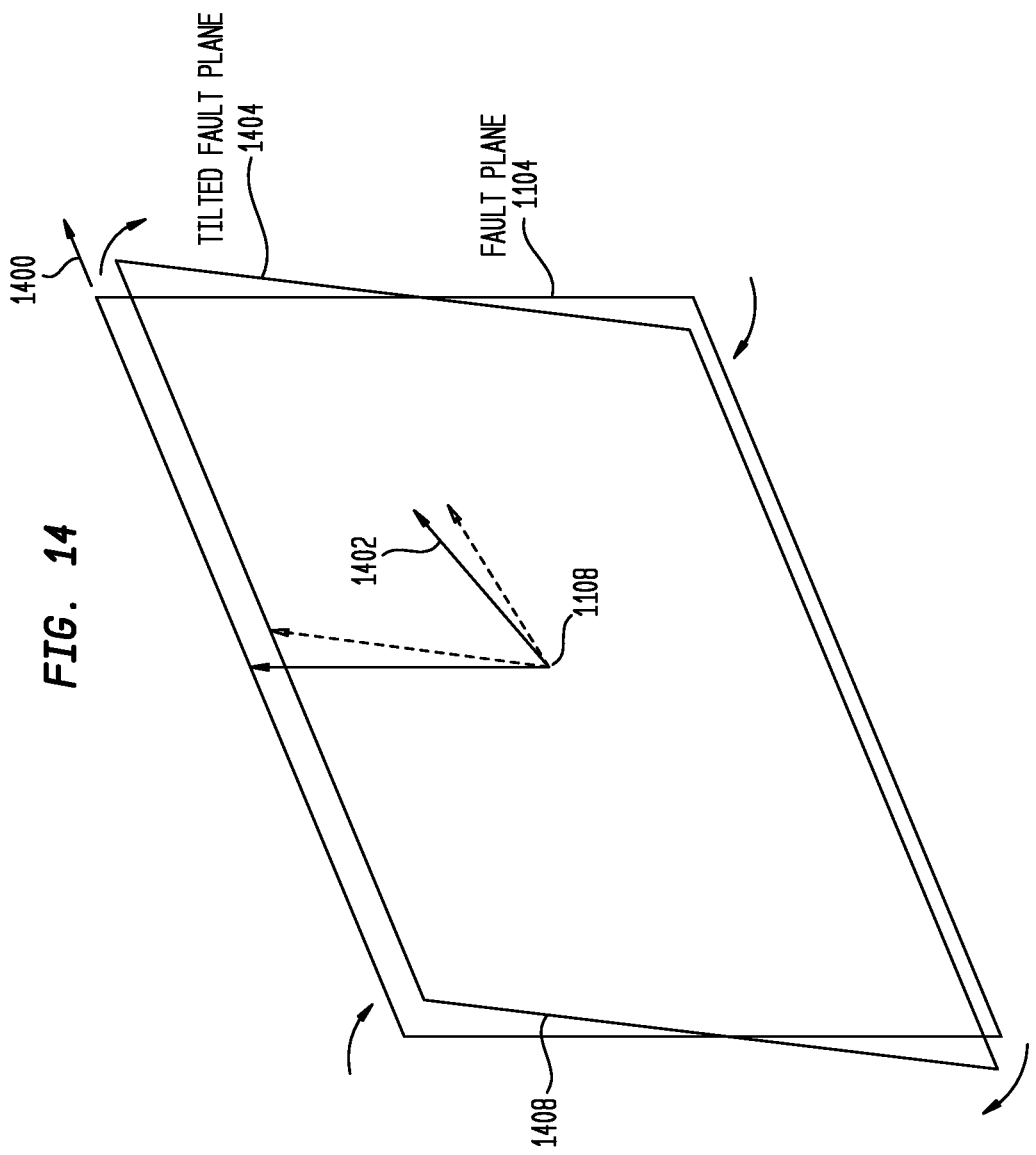
FIG. 14 shows one embodiment of a method for determining the azimuth, direction of first motion and tilt or dip angle of a fault.

Referring now to FIG. 14, and according to some embodiments, the azimuth and direction of first motion of the fault are determined using an assumption that the fault plane is vertical. Then the azimuth of the fault plane is used as a starting point to determine the dip angle or tilt of the fault plane. In some embodiments, the azimuth and direction of first motion of the fault, determined as described above, are used as a starting point to determine the tilt of the fault. A Sykes diagram is created using vertical fault plane 1104 aligned at azimuth 1400 previously determined, with first motion 1402 as previously determined. The same type of azimuthally-dependent correction used previously to determine the azimuth of the fault plane is applied to the microseismic data traces and an attribute of the microseismic data traces is computed as described above. Fault plane 1104 is then tilted as shown by applying a rotation about a horizontal axis through the voxel and parallel to the fault plane through third predetermined angle of rotation 1408. The result is tilted fault plane 1404. The Sykes diagram is then recomputed, an azimuthally-dependent correction applied, and the attribute is recalculated. This process is repeated until the fault plane has been tilted by rotation about a horizontal axis through the voxel and parallel to the fault plane through a third predetermined arc of rotation. The limits of the third arc of rotation are ninety degrees on each side of a vertical direction. The angle of rotation which produces the highest value of the attribute is determined, thus providing the tilt or dip angle of the fault.

Still referring to FIG. 14, and according to other embodiments, the azimuth and the tilt or dip of a fault and the direction of first motion are determined in one step. In some embodiments, a Sykes diagram is created assuming vertical fault plane 1104, with azimuth 1116 aligned with zero azimuth 1120, and vertical direction of first motion 1124. The Sykes diagram created using such assumptions is that shown in FIG. 12(a). The Sykes diagram is used to assign the microseismic data traces at the voxel to a compressional bin or a tensional bin. An azimuthally-dependent correction is then applied to the microseismic data traces, and an attribute of the microseismic data traces is computed.

Still referring to FIG. 14, in some embodiments the direction of first motion is rotated by first predetermined angle of rotation 1128 about a horizontal axis through the voxel and perpendicular to the fault plane, the rotation being in the plane of the fault, so that the direction of first motion has a vertical component and a horizontal component within the plane of the fault as shown at 1132. The Sykes diagram is recomputed for this configuration, and is again used to assign the microseismic data traces at the voxel to a compressional bin or a tensional bin, based upon where within the Sykes diagram the azimuth of the sensor position corresponding to each microseismic data trace places that microseismic data trace. The same type of azimuthally-dependent correction used previously is applied to the microseismic data traces. The same attribute of the traces is computed, and the maximum value recorded. The direction of first motion is rotated again through first predetermined angle of rotation 1128, and the process is repeated until the direction of first motion has been rotated through a predetermined first arc of rotation about a horizontal axis through the voxel and perpendicular to the fault plane.

Still referring to FIG. 14, fault plane 1104 is then tilted as shown at 1404 by applying a rotation about a horizontal axis through the voxel and parallel to fault plane 1104 through second predetermined angle of rotation 1408 to the fault plane 1104. The Sykes diagram is recomputed, an azimuthally-dependent correction applied, and the attribute is recalculated. This process is repeated until fault plane 1104 has been rotated through a second predetermined arc of rotation about a horizontal axis parallel to fault plane 1104.

Still referring to FIG. 14, the fault plane 1104 is then rotated about vertical axis 1112 through third predetermined angle of rotation 1116. The above process is repeated with the direction of first motion varying from vertical through the first predetermined arc of rotation and fault plane 1104 tilted through the second predetermined arc of rotation. The fault plane is rotated again about vertical axis 1112 through third predetermined angle of rotation 1116, and the above process repeated, until fault plane 1104 has been rotated about vertical axis 1112 by a third predetermined arc of rotation. The first predetermined arc of rotation, the second predetermined arc of rotation and the third predetermined arc of rotation are interdependent because of the symmetry of the Sykes diagrams and the fault mechanism. It will be apparent to one skilled in the art after reading this description that the order in which the three orthogonal rotations are performed has no effect on values contained in the resulting data set.

The result of the foregoing steps is a set of values corresponding to an attribute of the microseismic data traces at a plurality of combinations of azimuth values, first motion directions and tilt angles. The orientation of the fault plane, including the azimuth and the tilt or dip angle and the angle of first motion which correspond to the rotations at which the maximum value of the attribute of the microseismic data traces occurs are determined. The principal fracture direction may then be calculated from this information.

In some embodiments, after the azimuth and or the azimuth and dip angle of the fault have been determined, an azimuthally-dependent phase compensation is computed and applied for each of the microseismic data traces using the azimuthal alignment of the microseismic source at the voxel. In other embodiments, the azimuthally-dependent compensation combines an azimuthally-dependent phase compensation and an azimuthally-dependent amplitude adjustment. After this compensation has been applied, the microseismic data at the voxel traces align correctly.

In some embodiments, the compensated time shifted microseismic data traces are input into further processing. In some embodiments, the microseismic data traces are stacked to produce a stacked output microseismic data trace at the voxel. The stacked output microseismic data traces may then be used in further embodiments for analyzing the attributes of the stacked output microseismic data trace at each voxel position to determine hypocenter locations and times for microseismic events. The compensated time shifted microseismic data traces may be used for further SET processing as described in the above-referenced '361 and '353 patents. In other embodiments, the semblance values of the microseismic data traces after the azimuthally-dependent compensation has been applied are computed and used as inputs to the methods and procedures described in the Geiser patent application.

The principal fracture orientation in a volume of the subsurface usually does not vary rapidly. Therefore the principal fracture direction determined at closely spaced voxels is also varies slowly. In some embodiments efficiency may be achieved by selecting a subset of the voxels and using only the voxels in this subset to compute the fault or fracture orientation and direction of first motion. In some embodiments it is sufficient to determine the principal fracture orientation at selected points within the volume and interpolate the principal fracture orientations for the remaining points within the spatial volume, from which information azimuthally-dependent phase and amplitude compensations may be designed. In other embodiments, azimuthally-dependent phase and amplitude compensations are computed for each voxel within a spatial and temporal subset of the voxels, and the phase and amplitude compensations are interpolated for the remaining points within the spatial volume. In yet other embodiments, substantially all of the voxels within the spatial volume are used for the determination of the azimuth, first motion direction and tilt.

In some embodiments, the microseismic data traces in each voxel gather are stacked or the semblance is computed, and the results analyzed to identify possible microseismic events of interest. The azimuth, tilt and direction of first motion are determined only for segments of the spatial volume surrounding these possible microseismic events, and then the stack or semblance is recomputed to include the phase and amplitude compensations.

In some embodiments, where many sensor positions are used, some efficiencies may be achieved by using a subset of the microseismic data traces in each voxel gather for the determination of the fault or fracture orientation and direction of first motion. In some of these embodiments, the microseismic data traces within the voxel gather may be spatially subsampled. In other embodiments, the microseismic data traces beyond some horizontal distance from the voxel may be excluded.

For increased efficiency in data processing, in some embodiments, the first predetermined arc of rotation, the second predetermined arc of rotation, and the third predetermined arc of rotation may be limited based on knowledge of the primary fault or fracture orientation in the area. In some embodiments this knowledge may come from previous studies of the area. In other embodiments, the orientation, tilt and direction of first motion may be determined using the methods described above at a few selected voxels, and the information thus provided is used to constrain the arcs of rotation. In some embodiments, an approximate azimuth, tilt and direction of first motion are found for the maximum value of the attribute, and then the process described above is repeated, starting with this initial estimate and using a smaller angle of rotation about each axis in order to more precisely define the azimuth, tilt and direction of first motion for the fault or fracture.

The following figures show some examples of the embodiments described herein as well as other embodiments as they are applied to a set of synthetic data traces. In the following Figures, and to make the steps easier to follow, one trace is used, and then duplicated with phase and time shifts. In practice, although a microseismic event shows similar characteristics when recorded at multiple sensor positions, there are substantial differences in the traces recorded at different sensor positions due to noise, the presence of multiple reflections, and other factors known to those skilled in the art.

Figure 15A:
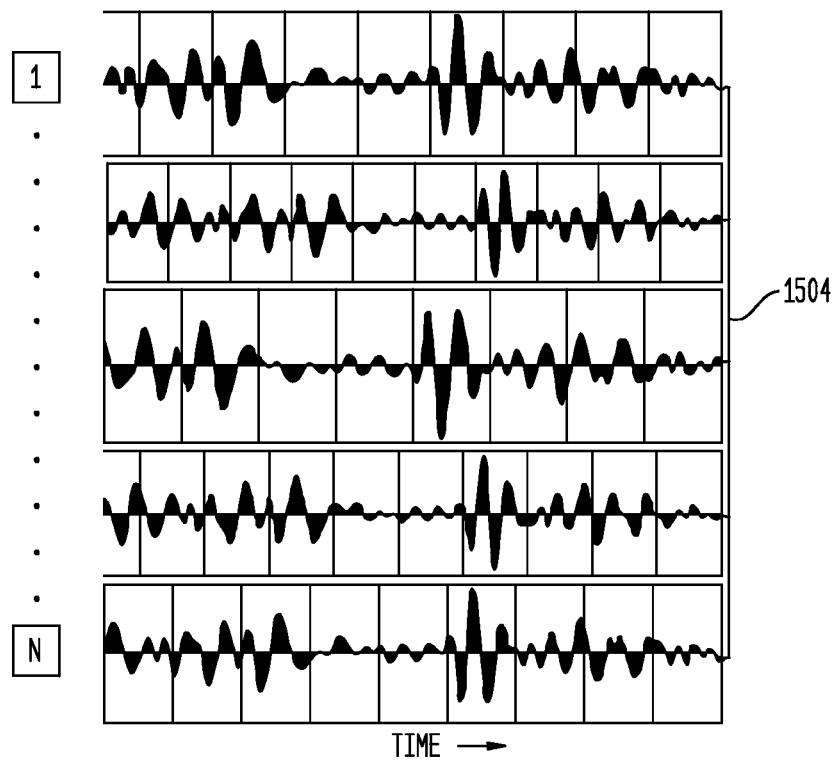
FIGS. 15(a) and 15(b) show microseismic data traces as recorded and after time shifting to voxel space.
Figure 15B:
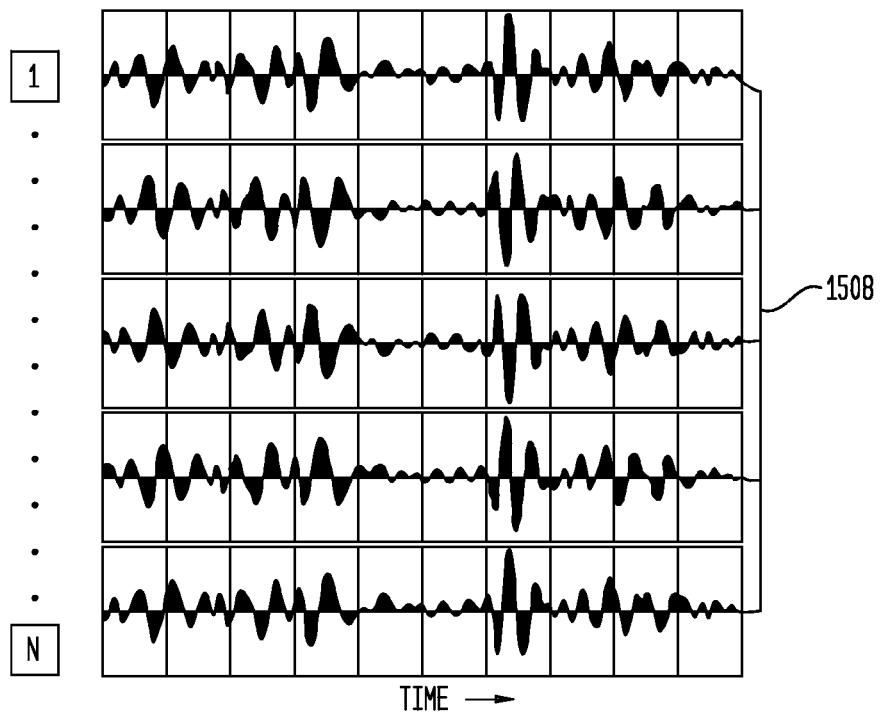

FIG. 15 (*a*) shows a plurality of microseismic data traces, 1-N, (1504) recorded at a plurality of sensor positions by recording system 10 as shown in FIG. 1. To convert this to an image of microseismic events, SET processing or a similar procedure is used. In one embodiment, the subsurface of the earth within the area of interest is divided into a 3D grid, each cell or voxel within the grid representing a possible location of the source of a seismic event. Using a known or estimated velocity model, for each point in the subsurface, the travel time and travel path to each sensor are computed, including azimuthal information. For each point in the subsurface grid, the trace recorded at each of N sensor positions has an appropriate travel time shift applied, so that the result is a set of N traces (1508) which may be considered to have originated at the selected voxel. If a microseismic event does indeed originate at the selected voxel, then the time shifted traces 1508 should show an alignment of energy as shown at in FIG. 15(*b*).

Referring now to FIG. 16(*a*), there are shown traces 1604 whose direction of first motion falls in the compressional part of a Sykes diagram. FIG. 16(*b*) shows traces 1608 whose direction of first motion falls in the tensional part of a Sykes diagram, where the phase differences are readily apparent. FIG. 16(*c*) shows traces 1612 whose direction of first motion falls in the compressional part of a Sykes diagram with no azimuthally-dependent correction, and FIG. 16(*d*) shows traces 1616 whose direction of first motion falls in the tensional part of a Sykes diagram after an azimuthally-dependent correction has been applied. The two sets of traces now match. FIG. 16(*e*) shows result 1620 of stacking these two sets of traces. Had the shown phase compensation had not been applied, the two sets of traces would have ended to cancel one another out when stacked, demonstrating the necessity of the type of azimuthally-dependent phase compensation as described above.

Although the above description includes many specific examples, they should not be construed as limiting the scope of the invention, but rather as merely providing illustrations of some of the many possible embodiments of this method. The scope of the invention should be determined by the appended claims and their legal equivalents, and not by the examples given.

We claim:

1. A method of determining an azimuth and a direction of first motion of a fault or fracture plane in a subsurface of the earth by optimizing at least one azimuthally-dependent attribute of microseismic signals generated by one or more microseismic sources within the earth's subsurface, comprising:
    recording microseismic data traces corresponding to the generated microseismic signals detected by plurality of sensors located at a plurality of sensor positions at or near the earth's surface, the recorded microseismic data traces being at least one of electrical, magnetic or optical signals generated by said sensors and recorded by a recording unit, the microseismic signals originating within a volume of the subsurface of the earth, located at least one of near and in the fault or fracture;
    subdividing the subsurface volume into a plurality of spatial volumes, each spatial volume corresponding to a selected time interval, each spatial volume comprising a plurality of voxels corresponding thereto;
    for each voxel within a selected spatial volume, applying a time shift to recorded microseismic data traces corresponding thereto, wherein the time shift is substantially equal to a travel time from each voxel to the sensor position corresponding thereto, thereby transforming the recorded microseismic data traces into a time shifted microseismic data trace for each combination of voxel and sensor position;
    selecting a subset of the voxels corresponding to the selected spatial volume for determination of the azimuth and direction of first motion, and
    for a selected voxel within the selected subset, determining for the voxel the azimuth of the fault or fracture plane and the direction of first motion of the fault or fracture corresponding to a maximum value of at least one azimuthally-dependent attribute of the microseismic data traces.

2. The method of claim 1, further comprising:
    assigning a direction within the subsurface volume corresponding to a zero azimuth, and
    computing a Sykes diagram for a focal mechanism at the selected voxel using an initial fault or fracture plane orientation and an initial direction of first motion.

3. The method of claim 2, further comprising:
    using information from the Sykes diagram, computing and applying an azimuthally-dependent correction to the microseismic data traces, and
    computing an azimuthally-dependent attribute of the microseismic data traces and determining a maximum value of such attribute.

4. The method of claim 3, further comprising:
    rotating the focal mechanism direction by a first predetermined angle of rotation about a first axis of rotation;
    recomputing the Sykes diagram using information from the recomputed Sykes diagram, and computing and applying an azimuthally-dependent correction to the microseismic data traces, and
    recomputing the azimuthally-dependent attribute of the microseismic data traces and determining the maximum value of the attribute.

5. The method of claim 4, further comprising repeating the above steps until the focal mechanism has been rotated about the first axis of rotation through a first predetermined arc of rotation.

6. The method of claim 5, further comprising rotating the focal mechanism through a second predetermined angle of rotation about a second axis of rotation and repeating the above steps until the focal mechanism has been rotated through a second predetermined arc of rotation about the second axis of rotation.

7. The method of claim 6, further comprising determining at the selected voxel the azimuth of the fault or fracture plane and the direction of first motion from the angles of rotation about the first and second axes of rotation which correspond to a maximum value of the azimuthally-dependent attribute of the microseismic data traces.

8. The method of claim 7, wherein the initial fault or fracture plane orientation is that of a vertical fault or fracture plane intersecting the selected voxel, the fault or fracture plane being oriented at zero azimuth, the initial direction of first motion being that of a vertical fault or fracture motion.

9. The method of claim 7, wherein the first axis of rotation is a horizontal axis through the selected voxel and is perpendicular to the fault or fracture plane corresponding to an axis of rotation of the direction of first motion and the second axis of rotation is a vertical axis centered at the selected voxel corresponding to an axis of rotation of the azimuth of the fault or fracture plane.

10. The method of claim 7, wherein the first predetermined arc of rotation is about one hundred eighty degrees starting at a vertical orientation and the second predetermined arc of rotation is about one hundred eighty degrees starting at zero azimuth.

11. The method of claim 7, wherein the first predetermined arc of rotation is about ninety degrees starting at a vertical orientation and the second predetermined arc of rotation is about three hundred sixty degrees starting at zero azimuth.

12. The method of claim 7, wherein the first axis of rotation is a vertical axis centered at the selected voxel corresponding to an axis of rotation of the azimuth of the fault or fracture plane and the second axis of rotation is a horizontal axis through the selected voxel and perpendicular to the fault or fracture plane corresponding to an axis of rotation of the direction of first motion.

13. The method of claim 7, wherein the first predetermined arc of rotation is about one hundred eighty degrees starting at a vertical orientation and the second predetermined arc of rotation is about one hundred eighty degrees starting at zero azimuth.

14. The method of claim 7, wherein the first predetermined arc of rotation is about three hundred sixty degrees starting at zero azimuth and the second predetermined arc of rotation is about ninety degrees starting at a vertical orientation.

15. The method of claim 7, wherein the first predetermined arc of rotation and the second predetermined arc of rotation are constrained based on estimates of the fault or fracture azimuth and direction of first motion.

16. The method of claim 7, wherein the azimuthally-dependent correction is an azimuthally-dependent phase compensation.

17. The method of claim 7, wherein the azimuthally-dependent correction is an azimuthally-dependent phase and amplitude adjustment.

18. The method of claim 7, wherein computing the azimuthally-dependent attribute of the microseismic data traces further comprises stacking the time shifted microseismic data traces.

19. The method of claim 7, wherein computing the azimuthally-dependent attribute of the microseismic data traces further comprises computing the semblance of the time shifted microseismic data traces.

20. The method of claim 7, wherein computing the azimuthally-dependent attribute of the microseismic data traces further comprises computing a first value of a stack of the microseismic data traces multiplied by a second value of a semblance of the microseismic data traces.

21. The method of claim 1, for the selected voxel, further comprising selecting a voxel size substantially equal to or smaller than dimensions of the microseismic events that are to be detected.

22. The method of claim 1 wherein selecting a subset of the voxels for determination of the azimuth and direction of first motion further comprises selecting substantially all of the plurality of voxels.

23. The method of claim 1, further comprising selecting a subset of the plurality of voxels by computing an attribute of the microseismic data traces for the voxels and identifying those voxels which may correspond to potential microseismic events.

24. The method of claim 1, wherein selecting a subset of the voxels for determination of the azimuth and direction of first motion further comprises selecting a subset of voxels based on the expected spatial variation of the fault orientation and principal stress direction.

25. The method of claim 1, further comprising selecting a subset of the microseismic data traces for each voxel based on the spatial distribution of the plurality of sensor positions relative to the voxel.

26. The method of claim 1, further comprising using the azimuthal alignment of the microseismic source for the voxel, computing and applying azimuthally-dependent compensation factors to the time shifted microseismic data traces corresponding to each voxel in the spatial volume to produce compensated time shifted microseismic data.

27. The method of claim 26 wherein the azimuthally-dependent compensation factors compensate for the azimuthal variation of the phase of the time shifted microseismic data.

28. The method of claim 26 wherein the azimuthally-dependent compensation factors compensate for the azimuthal variation of the phase and amplitude of the time shifted microseismic data.

29. The method of claim 26, further comprising stacking the compensated time shifted microseismic data traces for each voxel in the spatial volume to produce a stacked output microseismic data trace for the voxel.

30. The method of claim 26, further comprising analyzing the attributes of the stacked output microseismic data trace at each voxel position to determine hypocenter locations and corresponding times for microseismic events.

31. The method of claim 26, further comprising computing the semblance of the compensated time shifted microseismic data traces for each voxel in the spatial volume.

32. The method of claim 31, further comprising skeletonizing the semblance values of the compensated time shifted microseismic data traces to determine the location of faults and fractures in the subsurface.

33. The method of claim 7, further comprising determining the dip of a fault or fracture in the subsurface of the earth by the following steps:
using the azimuth of the fault or fracture plane and the direction of first motion corresponding to the maximum value of the azimuthally-dependent attribute of the microseismic data traces, and
determining the dip of the fault or fracture plane corresponding to the maximum value of an azimuthally-dependent attribute of the microseismic data traces.

34. The method of claim 33, wherein determining the dip of the fault or fracture plane corresponding to the maximum value of an azimuthally-dependent attribute of the microseismic data traces further comprises:
tilting the fault or fracture plane through a third predetermined angle of rotation about a third axis of rotation, recomputing the Sykes diagram, using the information from the recomputed Sykes diagram to compute and apply an azimuthally-dependent correction to the microseismic data traces, computing an azimuthally-dependent attribute of the microseismic data traces and computing the maximum value of the this attribute;
repeating the above steps until the fault or fracture mechanism has been rotated about the third axis of rotation through a third predetermined arc of rotation;
determining for the voxel the value of the angle of rotation about the third axis of rotation of the fault or fracture corresponding to the maximum value of the azimuthally-dependent attribute of the microseismic data traces, and
determining the dip of the fault or fracture plane from the value of the angle of rotation about the third axis of rotation of the fault or fracture corresponding to the maximum value of the azimuthally-dependent attribute of the microseismic data traces.

35. The method of claim 34, wherein the third axis of rotation is a horizontal axis centered on the voxel and parallel to the fault or fracture plane.

36. The method of claim 34, wherein the third predetermined arc of rotation is about ninety degrees on either side of a vertical orientation.

37. The method of claim 34, wherein the third predetermined arc of rotation is constrained based on estimates of the dip of the fault or fracture.

38. A method of determining an azimuth and a dip of a fault or fracture in a subsurface of the earth and a direction of first motion by optimizing at least one azimuthally-dependent attribute of microseismic signals generated by at least one microseismic source within the earth's subsurface, comprising:

recording microseismic data traces corresponding to the microseismic signals using a plurality of sensors located at a plurality of sensor positions at or near the earth's surface, the recorded microseismic data traces being at least one of electrical, magnetic or optical signals generated by said sensors and recorded by a recording unit, the microseismic signals originating within a volume of the subsurface;

subdividing the subsurface volume into a spatial volume comprising a plurality of voxels;

for each voxel within the spatial volume, applying a time shift to microseismic data traces corresponding thereto, wherein the time shift is substantially equal to a travel time from the voxel to the sensor position corresponding thereto, thereby transforming the microseismic data traces into a time shifted microseismic data trace for each combination of voxel and sensor position;

selecting a subset of the voxels for determination of the azimuth, dip and direction of first motion, and for each voxel within the selected subset, determining for the voxel the azimuth and dip of the fault or fracture and the direction of first motion of the fault or fracture corresponding to a maximum value of at least one azimuthally-dependent attribute of the microseismic data traces.

39. The method of claim 38, wherein determining the azimuth and dip of the fault or fracture and the direction of first motion corresponding to the maximum value of the azimuthally-dependent attribute of the microseismic data traces further comprises:

assigning a direction within the subsurface volume corresponding to a zero azimuth, and computing a Sykes diagram for the voxel using an initial fault or fracture orientation and an initial direction of first motion.

40. The method of claim 39, further comprising:

using information from the Sykes diagram, computing and applying an azimuthally-dependent correction to the microseismic data traces, and computing an azimuthally-dependent attribute of the microseismic data traces and computing the maximum value of the this attribute.

41. The method of claim 40, further comprising rotating the fault or fracture direction within the fault or fracture plane by a first predetermined angle of rotation about a first axis of rotation;

recomputing the Sykes diagram;

using information from the recomputed Sykes diagram, computing and applying an azimuthally-dependent correction to the microseismic data traces;

computing an azimuthally-dependent attribute of the microseismic data traces, and computing the maximum value of the this attribute.

42. The method of claim 41, further comprising repeating the above steps until the fault or fracture mechanism has been rotated about the first axis of rotation through a first predetermined arc of rotation.

43. The method of claim 42, further comprising:

rotating the vertical fault or fracture plane through a second predetermined angle of rotation about a second axis of rotation, and repeating the above steps until the fault or fracture mechanism has been rotated through a second predetermined arc of rotation about the second axis of rotation.

44. The method of claim 43, further comprising:

rotating the vertical fault or fracture plane about a third axis of rotation through a third predetermined angle of rotation, and repeating the above steps until the fault or fracture mechanism has been rotated through a third predetermined arc of rotation about the third axis of rotation.

45. The method of claim 44, further comprising determining for the voxel the azimuth, direction of first motion and dip of the fault or fracture from the angles of rotation about the horizontal and vertical axes corresponding to the maximum value of the azimuthally-dependent attribute of the microseismic data traces.

46. The method of claim 45, wherein the initial fault or fracture orientation is that of a vertical fault or fracture plane intersecting the voxel, the plane being oriented at a zero azimuth with zero dip, and the initial direction of first motion being a vertical fault or fracture motion.

47. The method of claim 45, wherein the first axis of rotation, the second axis of rotation and the third axis of rotation are mutually orthogonal and are selected from a horizontal axis through the voxel and perpendicular to the fault or fracture plane corresponding to an axis of rotation of the direction of first motion, a horizontal axis centered on the voxel and parallel to the fault or fracture plane corresponding to a variation of the dip of the fault plane, and a vertical axis centered for the voxel corresponding to an axis of rotation of the azimuth of the fault or fracture plane.

48. The method of claim 45, wherein the first predetermined arc of rotation, the second predetermined arc of rotation and the third predetermined arc of rotation are determined based on the selection of the first axis of rotation, the second axis of rotation and the third axis of rotation.

49. The method of claim 45, wherein the first predetermined arc of rotation, the second predetermined arc of rotation and the third predetermined arc of rotation are constrained based on estimates of the fault or fracture azimuth and direction of first motion.

50. The method of claim 45, wherein the azimuthally-dependent correction is an azimuthally-dependent phase compensation.

51. The method of claim 45, wherein the azimuthally-dependent correction is an azimuthally-dependent phase compensation and an azimuthally-dependent amplitude adjustment.

52. The method of claim 45, wherein computing an azimuthally-dependent attribute of the microseismic data traces further comprises stacking the time shifted microseismic data traces.

53. The method of claim 45, wherein computing an azimuthally-dependent attribute of the microseismic data traces further comprises computing a semblance of the time shifted microseismic data traces.

54. The method of claim 45, wherein computing an azimuthally-dependent attribute of the microseismic data traces further comprises computing a value of a stack of the microseismic data traces multiplied by a value of a semblance of the microseismic data traces.

55. The method of claim 38, wherein subdividing the subsurface volume into the spatial volume comprising the plurality of voxels further comprises selecting a voxel size substantially equal to or smaller than the dimensions of the microseismic events to be detected.

56. The method of claim 38, wherein selecting the subset of the voxels for determination of the azimuth and direction of first motion further comprises selecting substantially all of the voxels.

57. The method of claim 38, wherein selecting the subset of the voxels for determination of the azimuth and direction of first motion further comprises selecting the subset of the voxels by computing an attribute of the microseismic data traces for the voxels and identifying those voxels which may correspond to potential microseismic events.

58. The method of claim 38, wherein selecting the subset of the voxels for determination of the azimuth and direction of first motion further comprises selecting the subset of voxels based on the expected spatial variation of the fault orientation and principal stress direction.

59. The method of claim 38, further comprising selecting the subset of the microseismic data traces for each voxel based on the spatial distribution of the plurality of sensor positions relative to the voxel.

60. The method of claim 45, further comprising, using the azimuthal alignment of the microseismic source for the voxel, computing and applying azimuthally-dependent compensation factors to the time shifted microseismic data traces corresponding to each voxel in the spatial volume to produce compensated time shifted microseismic data.

61. The method of claim 60 wherein the azimuthally-dependent compensation factors compensate for the azimuthal variation of the phase of the time shifted microseismic data.

62. The method of claim 60 wherein the azimuthally-dependent compensation factors compensate for the azimuthal variation of the phase and amplitude of the time shifted microseismic data.

63. The method of claim 60, further comprising stacking the compensated time shifted microseismic data traces for each voxel in the spatial volume to produce a stacked output microseismic data trace for the voxel.

64. The method of claim 63, further comprising analyzing the attributes of the stacked output microseismic data trace for each voxel position to determine hypocenter locations and times for microseismic events.

65. The method of claim 60, further comprising computing the semblance of the compensated time shifted microseismic data traces for each voxel in the spatial volume.

66. The method of claim 65, further comprising skeletonizing the semblance values of the compensated time shifted microseismic data traces to determine the location of faults and fractures in the subsurface.

* * * * *